(12) United States Patent
Koyanagi et al.

(10) Patent No.: US 7,431,903 B2
(45) Date of Patent: Oct. 7, 2008

(54) TUBULAR TITANIUM OXIDE PARTICLES AND PROCESS FOR PREPARING SAME

(75) Inventors: Tsuguo Koyanagi, Fukuoka (JP); Katsuhiro Shirono, Fukuoka (JP); Atsushi Tanaka, Fukuoka (JP); Michio Komatsu, Fukuoka (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 10/494,176

(22) PCT Filed: Oct. 29, 2002

(86) PCT No.: PCT/JP02/11214

§ 371 (c)(1),
(2), (4) Date: Apr. 29, 2004

(87) PCT Pub. No.: WO03/037798

PCT Pub. Date: May 8, 2003

(65) Prior Publication Data

US 2004/0265587 A1    Dec. 30, 2004

(30) Foreign Application Priority Data

Oct. 30, 2001 (JP) ............................ 2001-332547
Nov. 30, 2001 (JP) ............................ 2001-367414
Jul. 5, 2002  (JP) ............................ 2002-197698

(51) Int. Cl.
*B32B 5/16*     (2006.01)
*C01G 23/047*   (2006.01)
*C01G 23/053*   (2006.01)
*C01G 23/08*    (2006.01)

(52) U.S. Cl. .................... 423/81; 423/84; 423/610; 428/402

(58) Field of Classification Search .................. 423/69, 423/81, 84, 610; 428/402
See application file for complete search history.

(56) References Cited

U.S. PATENT DOCUMENTS 6,538,194 B1 *   3/2003   Koyanagi et al. ............ 136/256

(Continued)

FOREIGN PATENT DOCUMENTS

EP    0 832 847 A1    4/1998

(Continued)

OTHER PUBLICATIONS

Yoshinaga et al, "Controlled Crystallization of Ultrafine Titanium Dioxide Particles in the Presence of Hydrophilic or Amphiphilic Polymer from Peroxotitanic Acid", Chemistry Letters, vol. 34, No. 8 (2005), 1094-1095.*

(Continued)

*Primary Examiner*—H. T Le
(74) *Attorney, Agent, or Firm*—The Webb Law Firm, P.C.

(57) ABSTRACT

The process for preparing tubular titanium oxide particles comprises subjecting a water dispersion sol, which is obtained by dispersing (i) titanium oxide particles and/or (ii) titanium oxide type composite oxide particles comprising titanium oxide and an oxide other than titanium oxide in water, said particles having an average particle diameter of 2 to 100 nm, to hydrothermal treatment in the presence of an alkali metal hydroxide. After the hydrothermal treatment, reduction treatment (including nitriding treatment) may be carried out. The tubular titanium oxide particles obtained in this process are useful as catalysts, catalyst carriers, adsorbents, photocatalysts, decorative materials, optical materials and photoelectric conversion materials. Especially when the particles are used for semiconductor films for photovoltaic cells or photocatalysts, prominently excellent effects are exhibited.

20 Claims, 2 Drawing Sheets

U.S. PATENT DOCUMENTS

| | | | |
|---|---|---|---|
| 6,602,918 B1 * | 8/2003 | Ichinose | 516/90 |
| 2003/0013607 A1 | 1/2003 | Morikawa et al. | |

FOREIGN PATENT DOCUMENTS

| | | |
|---|---|---|
| FR | 2573767 A1 | 5/1986 |
| FR | 2769922 A1 | 4/1999 |
| JP | 61291462 A | 12/1986 |
| JP | 62-283817 A | 12/1987 |
| JP | 63-185820 A | 8/1988 |
| JP | 01-220380 A | 9/1989 |
| JP | 02-255532 A | 10/1990 |
| JP | 5-504023 A | 6/1993 |
| JP | 10-152323 A | 6/1998 |
| JP | 10152323 A | 6/1998 |
| JP | 11-339867 A | 12/1999 |
| JP | 2000-077691 A | 3/2000 |
| JP | 2001-155791 A | 6/2001 |
| JP | 2001-266964 A | 9/2001 |
| JP | 2002-319439 A | 10/2002 |
| WO | WO 91/16719 A2 | 10/1991 |
| WO | 0154811 A1 | 8/2001 |

OTHER PUBLICATIONS

Adachi, Motonari et al., "Formation of Titania Nanotubes with High Photo-Catalytic Activity", *The Chemical Society of Japan*, 2000, pp. 942-943, Chemistry Letters 2000, XP-009087298.

Seo, Dong-Seok et al., "Preparation of Nanotube-Shaped $TiO_2$ Powder", *Journal of Crystal Growth*, Jul. 2001, pp. 428-432, vol. 229, Elsevier, Amsterdam, NL.

Kasuga, Tomoko et al., "Titania Nanotubes Prepared by Chemical Processing", *Advanced Materials*, Wiley-VCH, Oct. 20, 1999, pp. 1307-1311, vol. 11, No. 15, Weinheim, XP-000869425.

Kasuga, Tomoko et al., "Formation of Titanium Oxide Nanotube", *American Chemical Society*, 1998, pp. 3160-3163, vol. 14, XP-002444534.

Du, G.H. et al, "Preparation and Structure Analysis fo Titanium Oxide Nanotubes", *Applied Physics Letters*, Nov. 26, 2001, pp. 3702-3704, vol. 79, No. 22, American Institute of Physica, Melville, NY, XP-012029548.

Kasuga, Tomoko et al., "Titania Nanotubes Prepared by Chemical Processing", Advanced Materials, vol. 11, No. 15, 1999, pp. 1307-1311, Wiley.

* cited by examiner

40nm

TUBULAR TITANIUM OXIDE PARTICLES AND PROCESS FOR PREPARING SAME

TECHNICAL FIELD

The present invention relates to tubular titanium oxide particles useful for applications to catalysts, catalyst carriers, photocatalysts, photoelectric conversion materials, decorative materials and optical materials, and a process for preparing the particles. The present invention also relates to photovoltaic cells and photocatalysts using the tubular titanium oxide particles.

BACKGROUND ART

Titanium oxide particles and titanium oxide type composite oxide particles are applied to various uses taking advantage of their chemical properties.

For example, these particles are used for oxidation-reduction catalysts or carriers, decorative materials or plastic surface coating agents utilizing ultraviolet screening power, anti-reflection coating materials utilizing high refractive index, antistatic materials utilizing electrical conductivity, functional hard coating materials utilizing a combination of these effects, and antibacterial agents, antifouling agents or super hydrophilic coating films utilizing photocatalytic actions. In recent years, further, titanium oxide has been favorably used for photocatlaysts or so-called photoelectric conversion materials for converting light energy into electric energy because it has high band gap. Moreover, titanium oxide has been used also for secondary batteries such as lithium batteries, hydrogen occlusion materials, proton conductive materials, etc.

For the titanium oxide and the titanium oxide type composite oxides applied to various uses as described above, a great number of functions are required. For example, when the titanium oxide is used as a catalyst, not only activity to a main reaction but also selectivity, mechanical strength, heat resistance, acid resistance and durability are required. When the titanium oxide is used as a decorative material, not only ultraviolet screening effect but also smoothness, touch, transparency, etc. are required.

When the titanium oxide is used as a coating material, more improved film forming properties, adhesion properties, film hardness, mechanical strength, abrasion resistance, etc. are required in addition to transparency and high refractive index.

From the above viewpoints, nano-tubular crystalline titanium oxide has received attention, and for example, nano-tubular crystalline titania having high specific surface area has been proposed in Japanese Patent Laid-Open Publication No. 152323/1998.

In this publication, it is disclosed that a crystalline titania powder is contacted with an alkali and then if necessary subjected to heat (calcining) treatment to prepare nano-tubular crystalline titania. However, even if the process described in this publication, e.g., a process described in the working example, is faithfully carried out, spherical particles or agglomerated particles are produced in addition to tubular particles and they are contained in the resulting crystalline titania particles, so that the yield of nano-tubular crystalline titania is low. Moreover, because the amount of residual sodium is large, sufficient performance of a catalyst, a catalyst carrier, a photocatalyst or the like cannot be obtained, and in some cases, any performance is not exhibited at all. Thus, there are many problems in this process.

Under such circumstances, the present inventors have earnestly studied a process for preparing tubular crystalline titanium oxide particles, and as a result, they have found that in Japanese Patent Laid-Open Publication No. 152323/1998, a powder of crystalline titanium oxide, particularly a powder (crystalline titania powder) obtained by calcining a powder prepared by a sol-gel process at a high temperature, is used as a starting material, but by the use of the powder as a starting material, desired tubular crystalline titanium oxide particles are not obtained. The present inventors have further studied, and as a result, they have found that hydrothermal treatment of a titanium oxide sol, in which particles of specific particle diameters are dispersed, in the presence of an alkali makes it possible to obtain tubular titanium oxide particles in an extremely high yield without producing agglomerates or spherical particles.

Photoelectric Conversion Materials

It is also known that titanium oxide is used for semiconductors for photoelectric conversion materials of solar cells. Ordinary solar cells are constituted in the following manner. First, a semiconductor film for a photoelectric conversion material, on which a photosensitizer has been adsorbed, is formed as an electrode on a support such as a glass plate having been coated with a transparent conductive film, then another support such as a glass plate having been coated with a transparent conductive film as a counterpart electrode is arranged, and an electrolyte is enclosed between these electrodes.

When the photosensitizer adsorbed on the semiconductor for a photoelectric conversion material is irradiated with sunlight, the photosensitizer absorbs light of visible region to excite electrons in the photosensitizer. The thus excited electrons move to the semiconductor, then pass through the transparent conductive glass electrode and move to the counterpart electrode. The electrons having moved to the counterpart electrode reduce the oxidation-reduction system (specifically, solvent, ionic compound, etc. contained in the electrolyte) in the electrolyte. On the other hand, the photosensitizer from which the electrons have moved to the semiconductor is in a state of oxidant, and this oxidant is reduced by the oxidation-reduction system in the electrolyte and thereby returns to the original state. The electrons continuously flow in this manner, whereby the solar cell using the semiconductor for a photoelectric conversion material is driven.

As the photoelectric conversion material, a material wherein a photosensitizing dye having absorption in the visible light region is adsorbed on a semiconductor surface is employed. For example, a solar cell having a layer of a color developing agent such as a transition metal complex on a surface of a metal oxide semiconductor is described in Japanese Patent Laid-Open-Publication No. 220380/1989. In National Publication of International Patent No. 504023/1993, a solar cell having a layer of a photosensitizing dye such as a transition metal complex on a surface of a titanium oxide semiconductor layer doped with metallic ion is disclosed.

In order to enhance photoelectric conversion efficiency, it is important for the solar cells mentioned above that moving of electrons from the light-absorbed and excited photosensitizing dye layer to the titania film is rapidly carried out. If the moving of electrons is not carried out rapidly, recombination of a ruthenium complex with the electrons takes place to lower the photoelectric conversion efficiency.

In order to solve such a problem, the present applicant has proposed novel photovoltaic cells in Japanese Patent Laid-Open Publication No. 339867/1999, Japanese Patent Laid-Open Publication No. 77691/2000, Japanese Patent Laid-Open Publication No. 155791/2001 and Japanese Patent Application No. 123065/2001. However, photovoltaic cells having higher photoelectric conversion efficiency are desired.

Photocatalysts

Recently, articles utilizing photocatalytic action of titania have received attention. For example, tiles having titania films formed on their surfaces, curtains containing titania and deodorants wherein titania is supported on activated carbon or zeolite are on the market and have been popular.

These articles are all aiming at antifouling, antibacterial or deodorizing effect by decomposing contaminants, bacteria or odorous matters adhering onto their surfaces utilizing the photocatalytic action of titania.

It is said that when titania particles are irradiated with ultraviolet rays, electrons or holes are produced inside the particle and they are diffused onto the particle surface and function as an oxidizing agent or a reducing agent, that is, the photocatalytic action of titania is due to the oxidative effect or the reducing effect.

The titania coating film having such photocatalytic action needs to have a large thickness in order to increase photocatalytic activity. Further, in order that the electrons or the holes produced inside the particle by the light irradiation move rapidly to the surface of the coating film, the coating film needs to have denseness. Therefore, high-temperature treatment is carried out in the film formation process to promote fusion bonding of particles, whereby denseness of the resulting coating film is increased and hardness thereof is also increased. However, if the treating temperature is raised, the crystal structure of titania changes from anatase type to rutile type, and there is brought about a problem that the photocatalytic activity is lowered. Moreover, there is another problem that it is difficult to form the titania coating film having the photocatalytic action on a material having no heat resistance, such as glass, plastic, wood, fiber or cloth, because the coating film is treated at a high temperature in the film forming process.

On this account, an attempt to use titania particles having been subjected to high-temperature treatment in advance was made. The titania particles, however, have a disadvantage that when they are subjected to high-temperature treatment, they come to have large diameters, high refractive index and wide light scattering, and therefore, a film of high transparency cannot be obtained.

Under such circumstances, the present inventors have earnestly studied, and as a result, they have found that the above problems of the photovoltaic cells and the photocatalysts can be all solved by the use of tubular titanium oxide particles of the present invention. Based on the finding, the present invention has been accomplished.

It is an object of the present invention to provide a process for preparing tubular titanium oxide particles useful as catalysts, catalyst carriers, adsorbents, photocatalysts, decorative materials, optical materials, photoelectric conversion materials, etc., and tubular titanium oxide particles. It is another object of the present invention to provide photovoltaic cells and photocatalysts using the tubular titanium oxide particles.

SUMMARY OF THE INVENTION

One embodiment of the process for preparing tubular titanium oxide particles according to the present invention comprises:

subjecting a water dispersion sol, which is obtained by dispersing (i) titanium oxide particles and/or (ii) titanium oxide type composite oxide particles comprising titanium oxide and an oxide other than titanium oxide in water, said particles having an average particle diameter of 2 to 100 nm, to hydrothermal treatment in the presence of an alkali metal hydroxide.

It is preferable to carry out reduction treatment (including nitriding treatment) after the hydrothermal treatment.

In the present invention, the hydrothermal treatment may be carried out in the presence of ammonium hydroxide and/or an organic base together with the alkali metal hydroxide.

Another embodiment of the process for preparing tubular titanium oxide particles according to the present invention comprises:

subjecting a water dispersion sol, which is obtained by dispersing (i) titanium oxide particles and/or (ii) titanium oxide type composite oxide particles comprising titanium oxide and an oxide other than titanium oxide in water, said particles having an average particle diameter of 2 to 100 nm, to hydrothermal treatment in the presence of an alkali metal hydroxide and optionally ammonium hydroxide and/or an organic base, and then further subjecting the water dispersion sol to hydrothermal treatment in the presence of cation (including proton) other than alkali metal cation.

A further embodiment of the process for preparing tubular titanium oxide particles according to the present invention comprises:

subjecting a water dispersion of titanium oxide particles and/or titanium oxide type composite oxide particles comprising titanium oxide and an oxide other than titanium oxide, said particles having an average particle diameter of 2 to 100 nm, to hydrothermal treatment in the presence of an alkali metal hydroxide, and then subjecting the water dispersion to reduction treatment (including nitriding treatment).

In this process, ammonium hydroxide and/or one or more organic bases may be allowed to be present together with the alkali metal hydroxide.

In this process, further, after the hydrothermal treatment in the presence of ammonium hydroxide and/or one or more organic bases together with the alkali metal hydroxide, the water dispersion may be treated in the presence of cation other than alkali metal cation or proton.

The titanium oxide particles according to the present invention are obtained by the above-mentioned process and have a sodium content of not more than 0.1% by weight in terms of $Na_2O$.

Another embodiment of the tubular titanium oxide particles according to the present invention is represented by the following compositional formula (1):

$$Ti_aM_bO_xN_y \quad (1)$$

wherein a and b are numbers satisfying the conditions of $a+b=1$ and $b=0\sim0.2$, x and y are numbers satisfying the conditions of $1 \leq x+y < 2$, $1 \leq x < 2$ and $0 \leq y < 0.2$, and M is an element other than Ti, and contains titanium oxide as a main component.

The tubular titanium oxide particles preferably have an outer diameter ($D_{out}$) of 5 to 40 nm, an inner diameter ($D_{in}$) of 4 to 20 nm, a tube thickness of 0.5 to 10 nm, a length (L) of 50 to 1000 nm and a length (L)/outer diameter ($D_{out}$) ratio ($L/D_{out}$) of 10 to 200.

The element M other than titanium oxide is preferably one or more elements selected from Group Ia, Group Ib, Group IIa, Group IIb, group IIIa, Group IIIb, Group IVa, Group IVb, Group Va, Group Vb, Group VIa, Group VIb, Group VIIa and Group VIII of the periodic table, and is particularly preferably one or more elements selected from Si, Zr, Zn, Al, Ce, Y, Nd, W, Fe and Sb.

The photovoltaic cell according to the present invention has a metal oxide semiconductor film containing the above-mentioned tubular titanium oxide particles.

The photocatalyst according to the present invention uses the above-mentioned tubular titanium oxide particles.

DETAILED DESCRIPTION OF THE INVENTION

Figure 1:
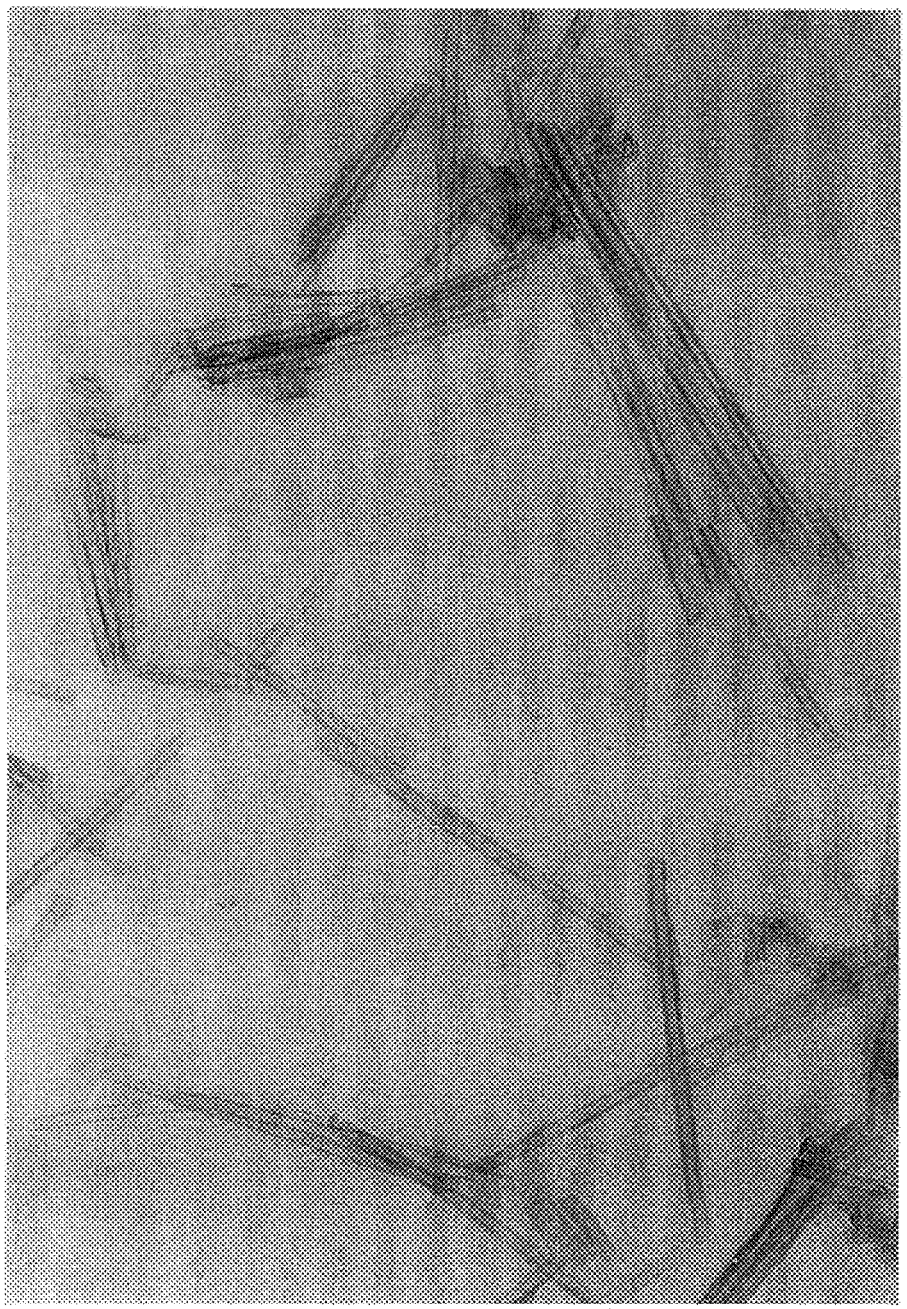
FIG. 1 shows a transmission type electron microscope photograph of tubular titanium oxide particles obtained in the present invention.
Figure 2:
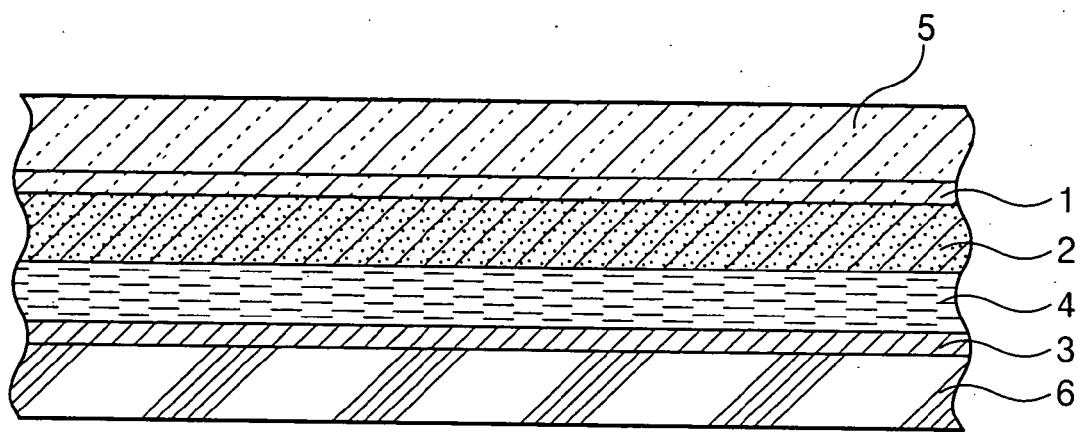
FIG. 2 is a schematic sectional view of one embodiment of a photovoltaic cell according to the present invention.

The best mode for carrying out the present invention is described in detail hereinafter.

Process for Preparing Tubular Titanium Oxide Particles

The process for preparing tubular titanium oxide particles according to the present invention comprises:

subjecting a water dispersion sol, which is obtained by dispersing (i) titanium oxide particles and/or (ii) titanium oxide type composite oxide particles in water, to hydrothermal treatment in the presence of an alkali metal hydroxide.

(i) Titanium Oxide Particles and/or (ii) Titanium Oxide Type Composite Oxide Particles In the present invention, titanium oxide particles and/or titanium oxide type composite oxide particles which contain hydroxides or hydrates are used as starting materials. These particles have an average particle diameter of 2 to 100 nm, preferably 5 to 80 nm, and are usually used in the form of a water dispersion sol.

When the average particle diameter is in the above range, a stable water dispersion sol is obtained, and tubular titanium oxide particles having excellent monodispersibility can be prepared in an extremely high yield. If the average particle diameter is smaller than the lower limit of the above range, it is difficult to obtain a stable water dispersion sol. Even if the average particle diameter is made larger than the upper limit of the above range, it is difficult to obtain tubular titanium oxide particles which are more excellent in the yield of the resulting tubular titanium oxide or the monodispersibility, and the particle dispersibility is sometimes lowered or the preparation of particles or a sol sometimes requires much time and labor.

In the present invention, the above particles are dispersed in water to prepare a water dispersion sol, and the water dispersion sol is employed. In the sol, an organic solvent such as an alcohol may be contained, when needed.

Although the concentration of the water dispersion sol of the titanium oxide particles and/or the titanium oxide type composite oxide particles comprising titanium oxide and an oxide other than titanium oxide is not specifically restricted, it is in the range of preferably 2 to 50% by weight, more preferably 5 to 40% by weight, in terms of an oxide. When the concentration is in this range, the sol is stable, and the particles are not agglomerated in the alkali treatment. Hence, tubular titanium oxide particles can be efficiently prepared. If the concentration is lower than the lower limit of the above range, production of tubular titanium oxide takes a long time because of too low concentration, or the yield of the resulting tubular titanium oxide is low. If the concentration is higher than the upper limit of the above range, stability of the water dispersion sol is lowered, or the resulting tubular titanium oxide is sometimes agglomerated because of high concentration in the alkali treatment.

In the present invention, the titanium oxide particles may be used singly, or the titanium oxide type composite oxide particles comprising titanium oxide and an oxide other than titanium oxide may be used, or a mixture of both the particles may be used.

As the oxide other than titanium oxide, an oxide of one or more elements selected from Group Ia, Group Ib, Group IIa, Group IIb, group IIIa, Group IIIb, Group IVa, Group IVb, Group Va, Group Vb, Group VIa, Group VIb, Group VIIa and Group VIII of the periodic table is preferable. Specific examples of such oxides include $SiO_2$, $ZrO_2$, $ZnO$, $Al_2O_3$, $CeO_2$, $Y_2O_3$, $Nd_2O_3$, $WO_3$, $Fe_2O_3$, $Sb_2O_5$, $CeO_2$, $CuO$, $AgO$, $AuO$, $Li_2O$, $SrO$, $BaO$, $RuO_2$.

If the above oxide is contained and if the oxide is an alkali-soluble oxide, tubular titanium oxide particles are particularly easily produced. If the oxide is an alkali-slightly soluble oxide, the oxide remains in the resulting tubular titanium oxide particles and can impart a function of a composite oxide, such as solid acid catalytic function or ion exchange function, to the resulting tubular titanium oxide particles.

Of the above oxides, $SiO_2$, $ZrO_2$, $ZnO$, $Al_2O_3$, $CeO_2$, $Y_2O_3$, $Nd_2O_3$, $WO_3$, $Fe_2O_3$ and $Sb_2O_5$ are particularly preferable in the present invention. When these oxides are contained, yield of tubular titanium oxide is extremely high, and by virtue of the remaining oxides, ultraviolet absorption region, dielectric constant, photocatalytic activity, proton conductivity, solid acid property, etc. of the resulting tubular titanium oxide can be controlled. Moreover, heat stability and chemical stability can also be controlled.

The content of the oxide other than titanium oxide in the titanium oxide type composite oxide particles varies depending upon whether the oxide is alkali-soluble or alkali-slightly soluble, but it is in the range of preferably 1 to 50% by weight, more preferably 2 to 25% by weight. When the content thereof is in this range, tubular titanium oxide particles can be prepared in a high yield.

If the content of the oxide other than titanium oxide is higher than the upper limit of the above range, yield of the tubular titanium oxide is sometimes lowered or spherical or needle-like particles are sometimes produced even in case of an alkali-soluble oxide, and in case of an alkali-slightly soluble oxide, tubular titanium oxide is not produced occasionally.

The process for preparing the water dispersion sol wherein the above particles are dispersed is not specifically restricted, but a titanium oxide sol and a titanium oxide type composite oxide sol disclosed in Japanese Patent Laid-Open Publication No. 283817/1987, Japanese Patent Laid-Open Publication No. 185820/1988, Japanese Patent Laid-Open Publication No. 255532/1990, etc., which were applied by the present applicant, are particularly preferably employed. For example, hydrogen peroxide is added to a titania sol or a titania gel to dissolve the titania sol or the titania gel, then the resulting solution is mixed with a titanium oxide sol, a titanium hydroxide sol, a sol of an inorganic oxide other than titanium oxide or an inorganic hydroxide sol, and the mixture is heated, whereby the water dispersion sol can be prepared.

For preparing titanium oxide particles or titanium oxide type composite oxide particles used in the process for preparing tubular titanium oxide particles according to the invention, it is preferable to use peroxotitanic acid as a titanium oxide source. The titanium oxide particles or the titanium oxide type composite oxide particles obtained by the use of peroxotitanic acid have uniform particle diameters, and hence a stable water dispersion sol can be obtained.

An example of the process for preparing a water dispersion (sol) of titanium oxide particles or a water dispersion (sol) of titanium oxide type composite oxide particles using peroxotitanic acid is given below.

(a) Step of Preparing Gel or Sol of Orthotitanic Acid

First, a titanium compound is hydrolyzed by a hitherto known process to prepare a sol or a gel of orthotitanic acid.

The gel of orthotitanic acid can be obtained by using a titanic salt, such as titanium chloride, titanium sulfate or titanyl sulfate, as a titanium compound, adding an alkali to an aqueous solution of the titanic salt to neutralize the solution and washing the solution.

The sol of orthotitanic acid can be obtained by passing an aqueous solution of a titanic salt through an ion exchange resin to remove anion or by adding an acid or an alkali to an aqueous solution and/or an organic solvent solution of titanium alkoxide, such as titanium tetramethoxide, titanium tetraethoxide or titanium tetraisopropoxide, to perform hydrolysis.

The titanium salt aqueous solution to be subjected to neutralization or hydrolysis preferably has pH of 7 to 13. If pH of the titanium salt aqueous solution is in this range, a desired gel or sol can be obtained. If pH of the titanium salt aqueous solution is out of the above range, the later-described specific surface area of the gel or sol sometimes becomes too low, and production of tubular titanium oxide, particularly crystalline titanium oxide, tends to be lowered.

The temperature for the neutralization or the hydrolysis is in the range of preferably 0 to 40° C., particularly preferably 0 to 30° C. When the temperature is in this range, it is possible to efficiently produce crystalline tubular titanium oxide particles. If the temperature for the neutralization or the hydrolysis is out of the above range, production of tubular titanium oxide, particularly crystalline tubular titanium oxide, tends to be lowered.

The orthotitanic acid particles in the resulting gel or sol are preferably amorphous.

(b) Step of Preparing Water Dispersion Sol of Titanium Oxide Fine Particles

Subsequently, to the gel or sol of orthotitanic acid or a mixture thereof is added hydrogen peroxide to dissolve orthotitanic acid and thereby prepare a peroxotitanic acid aqueous solution. Then, the solution is aged at a high temperature to prepare a water dispersion sol of titanium oxide fine particles.

In the preparation of the peroxotitanic acid aqueous solution, the gel or sol of orthotitanic acid or a mixture thereof is preferably heated or stirred according to necessity. If the concentration of orthotitanic acid is too high, a long time is required for dissolving the acid, and besides an undissolved gel is precipitated or the resulting peroxotitanic acid aqueous solution becomes viscous. Therefore, the $TiO_2$ concentration is preferably not more than about 10% by weight, more preferably not more than about 5% by weight.

The amount of hydrogen peroxide added is such an amount that the $H_2O_2/TiO_2$ (orthotitanic acid: in terms of $TiO_2$) weight ratio is not less than 1, and in this case, the orthotitanic acid can be completely dissolved. If the $H_2O_2/TiO_2$ weight ratio is less than 1, the orthotitanic acid cannot be dissolved completely, and the unreacted gel or sol sometimes remains.

As the $H_2O_2/TiO_2$ weight ratio becomes higher, the rate of dissolving the orthotitanic acid is increased and the reaction is completed in a shorter period of time. However, even if hydrogen peroxide is used excessively, the unreacted hydrogen peroxide remains in the system, and it is economically disadvantageous. When hydrogen peroxide is used in the above amount, the orthotitanic acid dissolves in about 0.5 to 20 hours.

Then, the resulting solution is aged at a high temperature of not lower than 50° C. to prepare a water dispersion sol of titanium oxide fine particles.

The resulting water dispersion sol of titanium oxide fine particles can be subjected to hydrothermal treatment in the temperature range of 50 to 300° C., preferably 80 to 250° C., optionally in the presence of ammonium hydroxide and/or an organic base. As the organic base, the same organic base as described later can be employed.

It is desirable to add the ammonium hydroxide and/or the organic base in such an amount that pH of the dispersion becomes 8 to 14, preferably 10 to 13.5, at room temperature.

When the hydrothermal treatment is carried out under the conditions of the above temperature and the above pH of the dispersion, crystallinity of the finally obtained tubular titanium oxide and yield thereof tend to be enhanced.

In the above steps (a) and (b), it is possible that a peroxotitanic acid aqueous solution is prepared by the use of a titanium hydride fine powder as a titanium compound and from the peroxotitanic acid aqueous solution, a water dispersion sol of titanium oxide fine particles is prepared in the same manner as described above.

In this case, if the titanium hydride fine powder is dispersed in water, the resulting dispersion can be substituted for the gel or sol of orthotitanic acid prepared in the step (a).

When the titanium hydride fine powder is dispersed in water, the $TiO_2$ concentration is preferably not more than about 10% by weight, more preferably not more than about 5% by weight. Also when the titanium hydride fine powder is used instead of the orthotitanic acid, the amount of hydrogen peroxide added is such an amount that the $H_2O_2/TiO_2$ (titanium hydride: in terms of $TiO_2$) weight ratio becomes not less than 1 similarly to the above. The water dispersion of the titanium hydride fine powder may be heated to not lower than about 50° C. or stirred, when needed.

A water dispersion (sol) of titanium oxide type composite oxide particles can be prepared in the following manner. Hydrogen peroxide is added to the gel or sol of orthotitanic acid or a mixture thereof to give a peroxotitanic acid aqueous solution wherein the orthotitanic acid is dissolved, and with this aqueous solution, a salt of inorganic compound particles of an element other than titanium (e.g., silica particles, silica sol, alumina particles, zirconia particles), alkoxisilane, metal alkoxide, zirconium chloride, magnesium chloride or the like is mixed, then the mixture is heated, and hydrothermal treatment is carried out in the temperature range of 50 to 300° C., preferably 80 to 250° C., optionally in the presence of ammonium hydroxide and/or an organic base, similar to the aforesaid step (b).

(c) Hydrothermal Treatment Step

The water dispersion sol of (i) titanium oxide particles and/or (ii) titanium oxide type composite oxide particles prepared as above was then subjected to hydrothermal treatment in the presence of an alkali metal hydroxide.

Examples of the alkali metal hydroxides employable herein include LiOH, NaOH, KOH, RbOH, CsOH and mixtures thereof. Of these, particularly preferable are NaOH, KOH and a mixture thereof because the yield of tubular titanium oxide particles is high.

The amount of the alkali metal hydroxide added is desirably such an amount that the molar ratio $(A_M)/(T_M)$ of the number of moles $(A_M)$ of the alkali metal hydroxide to the number of moles $(T_M)$ of $TiO_2$ in the titanium oxide particles or the titanium oxide type composite oxide particles contained in the sol is in the range of 1 to 30, preferably 2 to 25. When the molar ratio $(A_M)/(T_M)$ is in this range, tubular titanium oxide particles can be prepared efficiently. If the molar ratio $(A_M)/(T_M)$ is lower than the lower limit of the above range, crystallization of the titanium oxide particles or the titanium oxide type composite oxide particles hardly takes place, and hence tubular titanium oxide particles are not obtained. If the molar ratio $(A_M)/(T_M)$ is higher than the upper limit of the above range, plate titanium oxide particles tend to be increased to lower yield of tubular titanium oxide particles.

In the present invention, the hydrothermal treatment may be carried out in the presence of ammonium hydroxide and/or an organic base together with the alkali metal hydroxide.

Examples of the organic bases include quaternary ammonium salts, such as tetramethylammonium salt, hydroxides, and amines, such as monoethanolamine, diethanolamine and triethanolamine.

When the ammonium hydroxide and/or the organic base is allowed to coexist, the amount thereof is desirably such an amount that the ratio $[(A_M)+(OB_M)]/(T_M)$ of the total number of moles $[(A_M)+(OB_M)]$ of the ammonium hydroxide and/or the organic base to the number of moles $(T_M)$ of $TiO_2$ becomes 1 to 30, preferably 2 to 25. When the ammonium hydroxide and/or the organic base is allowed to coexist, further, the molar ratio of $(A_M):(OB_M)$ is desirably in the range of 0:1 to 1:1, preferably 0:1 to 0.5:1. When the ammonium hydroxide and/or the organic base is allowed to coexist in this manner, the amount of the alkali metal hydroxide used can be decreased, and hence, the amount of alkali metal impurities contained in the tubular titanium oxide fine particles can be decreased. Consequently, it becomes possible to favorably use the tubular titanium oxide particles as catalysts (carriers) or photocatalysts.

In the presence of the alkali metal hydroxide and if necessary the ammonium hydroxide and/or the organic base, the water dispersion sol of titanium oxide particles and/or titanium oxide type composite oxide particles is subjected to hydrothermal treatment in the temperature range of 50 to 350° C., preferably 80 to 250° C. When the temperature is in this range, tubular titanium oxide particles can be prepared efficiently. If the hydrothermal treatment temperature is lower than the lower limit of the above range, a long time is required for the production of tubular titanium oxide fine particles, or the yield of the tubular titanium oxide fine particles is low. Even if the hydrothermal treatment temperature is higher than the upper limit of the above range, the rate of production of the tubular titanium oxide fine particles is not increased or the yield does not become higher, and extra heat energy is consumed.

Then, the resulting tubular titanium oxide fine particles may be subjected to washing, when needed. The washing method is not specifically restricted provided that the amount of an alkali metal or the like can be decreased, and various methods hitherto known, such as dehydration filtration method, ultrafiltration membrane method, ion exchange resin method, electrodialysis method and reverse osmosis method, are adoptable. The washing may be carried out by the use of acids such as hydrochloric acid and nitric acid.

In the present invention, the hydrothermal treatment is carried out in the presence of the alkali metal hydroxide and if necessary ammonium hydroxide and/or organic base, then washing is carried out when needed, and thereafter, the resulting particle dispersion may be further subjected to hydrothermal treatment in the presence of cation (including proton) other than alkali metal cation.

That is to say, another embodiment of the process for preparing tubular titanium oxide particles according to the invention comprises:

subjecting the water dispersion sol of (i) titanium oxide particles and/or (ii) titanium oxide and an oxide other than titanium oxide to hydrothermal treatment in the presence of an alkali metal hydroxide and if necessary ammonium hydroxide and/or an organic base (first step), and then further subjecting the water dispersion sol to hydrothermal treatment in the presence of cation (including proton) other than alkali metal cation (second step).

The hydrothermal treatment temperature in each step is in the range of 50 to 350° C., preferably 80 to 250° C.

In the hydrothermal treatment of the first step, the types and the amounts of ammonium hydroxide and the organic base and the treating conditions in the presence of the metal hydroxide used are the same as those previously described. After the hydrothermal treatment of the first step is carried out in the presence of the alkali metal hydroxide, the resulting dispersion may be washed to remove liberating alkali metal impurities in the dispersion and on the particle surfaces, when needed.

The washing method is not specifically restricted provided that the amount of an alkali metal or the like can be decreased, and various methods hitherto known, such as dehydration filtration method, ultrafiltration membrane method, ion exchange resin method, electrodialysis method and reverse osmosis method, are adoptable. The washing can be carried out by the use of acids such as hydrochloric acid and nitric acid.

The hydrothermal treatment of the second step is carried out in the presence of cation (including proton) other than the alkali metal cation. Examples of cation sources include acids, salts containing no alkali metal, and organic bases. Examples of the acids include mineral acids, such as hydrochloric acid, nitric acid and sulfuric acid; and organic acids, such as acetic acid, oxalic acid, citric acid, glycolic acid, glycidic acid, malonic acid and maleic acid. Examples of the salts containing no alkali metal include ammonium salts, such as ammonium chloride, ammonium nitrate, ammonium sulfate and ammonium acetate. Examples of the organic bases include ammonium hydroxide, quaternary ammonium salts such as tetramethylammonium salt, hydroxides containing the ammonium ion, and amines such as monoethanolamine, diethanolamine and triethanolamine.

The acid, the salt containing no alkali metal or the organic base mentioned above is used in such an amount that the molar ratio $(P_M/T_M)$ of the number of moles $(P_M)$ of the acid or the salt containing no alkali metal or the organic base to the number of moles $(T_M)$ of $TiO_2$ in the titanium oxide particles or the titanium oxide type composite oxide particles is in the range of 1 to 30, preferably 2 to 15.

For adding proton, it is possible to contact the dispersion with an ion exchange resin or the like. The ion exchange resin is preferably a hydrogen type cation exchange resin. As the ion exchange resin, an amphoteric ion exchange resin may be used, or an anion exchange resin may be used in combination, when needed. By the treatment using the organic acid, tubular titanium oxide containing decreased amount of an alkali metal, particularly Na, can be obtained without deterioration of the crystalline state.

Through the hydrothermal treatment of the second step, the crystalline state of the resulting tubular titanium oxide can be enhanced without calcining at high temperatures.

Further, the amount of residual alkali metal in the titanium oxide particles is decreased, and consequently, crystalline tubular titanium oxide particles having high crystallinity, which are employable for catalysts, catalyst carriers, photocatalysts, decorative materials, optical materials, photoelectric conversion material, etc., can be prepared.

The hydrothermal treatment of the second step in the presence of cation other than alkali metal cation may be repeated plural times.

In comparison of the tubular titanium oxide particles obtained in the hydrothermal treatment of the second step with the tubular titanium oxide particles obtained in the hydrothermal treatment of the first step, the particle properties such as particle shape and specific surface area are the same except that the particles obtained in the second step contain smaller amount of impurities and have higher crystallinity than the particles obtained in the first step.

After the hydrothermal treatment, drying is carried out. There is no specific limitation on the drying method, and hitherto known methods are adoptable. For example, any of air drying, heating and freeze drying is adoptable.

After the drying, reduction treatment may be carried out, when needed.

(d) Reduction Treatment

By carrying out reduction treatment after drying, the later-described reduction type tubular titanium oxide particles can be obtained. The reduction treatment can be carried out on any of the particles having been subjected to one hydrothermal treatment and the particles having been subjected to two or more hydrothermal treatments.

The atmosphere of the reduction treatment is not specifically restricted provided that the tubular titanium oxide particles represented by the aforesaid formula (1) (sometimes referred to as "reduction type tubular titanium oxide" hereinafter) can be obtained, but it is preferable to carry out the reduction treatment in (A) an inert gas atmosphere, under (B) reduced pressure or in (C) a reducing gas atmosphere.

Examples of the inert gases include $N_2$, He, Ne, Ar, Kr, Xe and Rn.

When the reduction treatment is carried out under reduced pressure, the degree of reduced pressure varies depending upon the treating temperature and the treating time, but it has only to be lower than atmospheric pressure.

Examples of the reducing gases employable herein include nitrogen compounds having reducing ability, such as ammonia, amine, hydrazine and pyridine; and hydrocarbons, such as methane, ethane and propane.

The reduction treatment temperature is desirably in the range of 100 to 700° C., preferably 200 to 500° C.

When the reduction treatment temperature is in the above range, reduction type tubular titanium oxide particles aimed by the present invention can be prepared. If the reduction treatment temperature is too low, reactions, such as elimination of lattice oxygen of the tubular titanium oxide particles and substitution of the eliminated oxygen with nitrogen atom, hardly take place, and therefore, the reduction type tubular titanium oxide of the invention is not obtained occasionally.

If the reduction treatment temperature is too high, elimination of oxygen proceeds too much, and the crystalline state is deteriorated at the same time. Hence, sufficient conductivity, photocatalytic performance, catalytic performance and adsorption power, and desired optical properties and photoelectric conversion properties cannot be obtained occasionally.

The reduction type tubular titanium oxide particles thus obtained have an alkali content of not more than 0.1% by weight, preferably not more than 0.05% by weight, particularly preferably not more than 0.01% by weight, in terms of $Na_2O$.

Particularly, the reduction type tubular titanium oxide particles having an alkali content of not more than 0.01% by weight in terms of $Na_2O$ are useful not only as catalyst carriers and adsorbents but also as conductive materials, photocatalysts, photoelectric conversion semiconductor materials and optical materials.

Tubular Titanium Oxide Particles

The tubular titanium oxide particles of the invention are those obtained by the preparation process described above.

The tubular titanium oxide particles have an outer diameter ($D_{out}$) of 5 to 40 nm, an inner diameter ($D_{in}$) of 4 to 30 nm, a tube thickness of 0.5 to 20 nm, a length (L) of 25 to 1000 nm and a length (L)/outer diameter ($D_{out}$) ratio ($L/D_{out}$) of 5 to 200.

In FIG. 1, an electron microscope photograph of the tubular titanium oxide particles is shown.

The outer diameter ($D_{out}$), the inner diameter ($D_{in}$) and the length (L) are determined by taking a transmission type electron microscope photograph of the tubular titanium oxide particles, measuring values of 100 particles and calculating average values. The inner diameter ($D_{in}$) can be determined from a line that forms a contrast border observed inside the line for determining an outer diameter.

The composition of the tubular titanium oxide particle depends upon composition of the starting titanium oxide particle used. When the starting material contains an oxide other than titanium oxide, the resulting particles also contain the oxide other than titanium oxide in the same proportion.

Examples of crystal types (crystal forms) of the tubular titanium oxide particles include anatase type, rutile type and brookite type. The crystalline state of the resulting particle varies depending upon the heat treatment, the type of the starting titanium oxide sol, etc.

Especially when the alkali treatment is carried out in two steps and in the second step or thereafter hydrothermal treatment is carried out in the presence of cation containing no alkali metal, the resulting tubular titanium oxide particles have an alkali content of not more than 0.1% by weight, preferably not more than 0.05% by weight, particularly preferably not more than 0.01% by weight, in terms of $Na_2O$, and they are desirable.

Reduction Type Tubular Titanium Oxide Particles

One embodiment of the tubular titanium oxide particles according to the invention is represented by the following compositional formula (1) and contains titanium oxide as a main component. Since this tubular titanium oxide particle is not a complete oxide, it is sometimes referred to as a "reduction type tubular titanium oxide particle".

$$Ti_a M_b O_x N_y \qquad (1)$$

wherein a and b are numbers satisfying the conditions of a+b=1 and b=0~0.2, x and y are numbers satisfying the conditions of $1 \leq x+y < 2$, $1 \leq x < 2$ and $0 \leq y < 0.2$, and M is an element other than Ti.

In the formula (1), the proportion b of the element M other than Ti is in the range of 0 to 0.2, preferably 0 to 0.15.

If the proportion b of the element M other than Ti exceeds 0.2, tubular titanium oxide is not obtained occasionally though it depends upon the type of the element M.

The proportions of oxygen atom (O) and nitrogen atom (N) are as follows. That is to say, $1 \leq x+y < 2$ is preferable, and $1.2 \leq x+y < 1.9$ is more preferable; $1 \leq x < 2$ is preferable, and $1.2 \leq x < 1.9$ is more preferable; and $0 \leq y < 0.2$ is preferable, and $0 \leq y \leq 0.1$ is more preferable.

When x+y is in the above range, the tubular titanium oxide particle becomes a non-stoichiometric substance, namely, not a complete oxide but a partially reduced low oxide, and this substance has lower semiconductor properties as compared with titanium oxide ($TiO_2$), that is, the tubular titanium oxide particle itself has conductivity. Further, the molecular orbital greatly varies, and thereby light absorption properties are changed. Therefore, tubular titanium oxide capable of absorbing not only ultraviolet rays but also visible light can be obtained.

When x+y is 2, this particle is titanium oxide or titanium oxide type composite oxide, so that there is no oxygen defect (this particle has a titanium oxidation number of 4 and is different from reduced titanium having a titanium oxidation number of less than 4), and an effect of enhancing necessary conductivity or an effect of widening visible absorption region cannot be obtained.

When x+y is less than 1, the crystalline state is lowered or cannot be maintained in some cases.

It is difficult to obtain reduction type titanium oxide having y of not less than 0.2, and even if such an oxide is obtained, conductivity or visible light absorption power is not increased.

The reduction type tubular titanium oxide particles of the invention sometimes contain hydrogen atom (H) in addition to the aforesaid elements and components.

The outer diameter ($D_{out}$), the inner diameter ($D_{in}$), the length (L) and the (L)/($D_{out}$) ratio of the reduction type tubular titanium oxide particles are the same as those of the aforesaid tubular titanium oxide particles (not reduction type). More specifically, the inner diameter ($D_{in}$) is in the range of 4 to 20 nm, preferably 4 to 15 nm; the tube thickness is in the range of 0.5 to 10 nm, preferably 0.5 to 8 nm; the length (L) is in the range of 50 to 1000 nm, preferably 100 to 500 nm; and the length (L)/outer diameter ($D_{out}$) ratio (L/$D_{out}$) is in the range of 10 to 200, preferably 10 to 100. The reduction type tubular titanium oxide particles having diameters, etc. of these ranges are useful as catalysts, catalyst carriers, adsorbents, photocatalysts, decorative materials, optical materials, photoelectric conversion materials, etc., and besides, they are effectively used for proton conductive materials, electrolyte films for fuel cells and other conductive materials.

The element M is preferably an element (M) selected from Group Ia, Group Ib, Group IIa, Group IIb, group IIIa, Group IIIb, Group IVa, Group IVb, Group Va, Group Vb, Group VIa, Group VIb, Group VIIa and Group VIII of the periodic table. Examples of such elements include Si, Zr, Zn, Al, Ce, Y, Nd, W, Fe, Sb, Ce, Cu, Ag, Au, Li, Sr, Ba and Ru. Of these, particularly preferable are Si, Zr, Zn, Al, Ce, Y, Nd, W, Fe and Sb. When these elements remain as oxides, ultraviolet absorption region, dielectric constant, photocatalytic activity, proton conductivity, solid acid property, etc. of the tubular titanium oxide particles can be controlled. The element M (element other than Ti) is derived from an oxide other than titanium oxide, which is added as a starting material.

The reduction type tubular titanium oxide particles can be prepared by subjecting the tubular titanium oxide particles obtained in the aforesaid preparation process to reduction treatment.

Uses

The tubular titanium oxide particles of the invention can be favorably used as catalysts, catalyst carriers, adsorbents, decorative materials and ultraviolet light absorbing agents. Particularly, the tubular titanium oxide particles having an alkali content of not more than 0.01% by weight in terms of $Na_2O$ are useful as photocatalysts and photoelectric conversion semiconductor materials.

When the tubular titanium oxide particles are used as catalysts, they are usually used as supported type catalysts on which metals, such as platinum, nickel and silver, are supported. Further, taking advantage of tubular form, they can be used as materials in which organic, inorganic or metal materials are inserted and which have new functions or materials in which magnetic materials are inserted and which have magnetic properties.

The reduction type tubular titanium oxide particles are useful as catalysts, adsorbents, photocatalysts, optical materials, photoelectric conversion materials, etc., and besides, they are effectively used for proton conductive materials, electrolyte films for fuel cells and other conductive materials.

Photovoltaic Cell

The photovoltaic cell according to the present invention comprises:

a substrate having an electrode layer (1) on its surface and having a metal oxide semiconductor film (2) which is formed on a surface of the electrode layer (1) and on which a photosensitizer is adsorbed, a substrate having an electrode layer (3) on its surface, both of said substrates being arranged in such a manner that the electrode layer (1) and the electrode layer (3) face each other, and an electrolyte layer provided between the metal oxide semiconductor film (2) and the electrode layer (3), wherein at least one pair of substrate and electrode have transparency, and the metal oxide semiconductor film (2) contains tubular titanium oxide particles.

Such a photovoltaic cell is, for example, a photovoltaic cell shown in FIG. 1.

FIG. 1 is a schematic sectional view of one embodiment of a photovoltaic cell of the present invention. In this embodiment, a transparent substrate 5 having a transparent electrode layer 1 on its surface and having a metal oxide semiconductor film 2 which is formed on a surface of the electrode layer 1 and on which a photosensitizer is adsorbed, and a substrate 6 having an electrode layer 3 having reduction catalytic ability on its surface are arranged in such a manner that the electrode layer 1 and the electrode layer 3 face each other, and between the metal oxide semiconductor film 2 and the electrode layer 3, an electrolyte 4 is enclosed.

As the transparent substrate 5, a substrate having transparency and insulating properties, such as a glass substrate or an organic polymer substrate (e.g., PET substrate), is employable.

The substrate 6 is not specifically restricted provided that it has a strength enough to withstand its use, and not only insulating substrates, such as a glass substrate and an organic polymer substrate (e.g., PET substrate), but also conductive substrates, such as substrates of metallic titanium, metallic aluminum metallic copper and metallic nickel, are employable.

As the transparent electrode layer 1 formed on the surface of the transparent substrate 5, a hitherto known electrode is employable. Examples of such electrodes include tin oxide, tin oxide doped with Sb, F or P, indium oxide doped with Sn and/or F, antimony oxide, zinc oxide and precious metals.

The transparent electrode layer 1 can be formed by a hitherto known method, such as a thermal decomposition method or a CVD method.

As the electrode layer 3 formed on the surface of the substrate 6, a hitherto known electrode is employable. Examples of such electrodes include electrode materials, such as platinum, rhodium, ruthenium metal and ruthenium oxide, electrodes obtained by plating or depositing the electrode materials on the surfaces of conductive materials, such as tin oxide, tin oxide doped with Sb, F or P, indium oxide doped with Sn and/or F and antimony oxide, and carbon electrode.

The electrode layer 3 can be formed by a hitherto known method, such as a method comprising providing the electrode on the substrate 6 by direct coating, plating or deposition, subjecting a conductive material to a conventional method such as thermal decomposition or CVD method to form a conductive layer and then plating or depositing the above electrode material on the conductive layer.

The substrate 6 may be a transparent substrate similarly to the transparent substrate 5, and the electrode layer 3 may be a transparent electrode layer similarly to the transparent electrode layer 1.

The visible light transmittance of the transparent substrate 5 and the transparent electrode layer 1 is Preferably as high as possible, and specifically, it is not less than 50%, particularly preferably not less than 90%. When the visible light transmittance is in this range, a photovoltaic cell having high photoelectric conversion efficiency can be obtained.

Each of the transparent electrode layer 1 and the electrode layer 3 preferably has a resistance value of not more than 100 $\Omega/cm^2$. When the resistance value of the electrode layer is in this range, a photovoltaic cell having high photoelectric conversion efficiency can be obtained.

The metal oxide semiconductor film 2 is formed on the transparent electrode layer 1 that is formed on the transparent substrate 5. The metal oxide semiconductor film 2 may be formed on the electrode layer 3 that is formed on the substrate 6. The thickness of the metal oxide semiconductor film 2 is in the range of preferably 0.1 to 50 µm, more preferably 2 to 20 µm.

In the metal oxide semiconductor film 2, the aforesaid tubular titanium oxide particles are contained.

As the tubular titanium oxide particles, those having the aforesaid inner diameter, outer diameter, thickness and length are employed. It is desired that the outer diameter ($D_{out}$) is in the range of 5 to 40 nm, preferably 10 to 30 nm, the inner diameter ($D_{in}$) is in the range of 4 to 30 nm, preferably 5 to 20 nm, the tube thickness is in the range of 1 to 20 nm, preferably 2 to 15 nm, the length (L) is in the range of 25 to 1000 nm, preferably 50 to 600 nm, and the length (L)/outer diameter ($D_{out}$) ratio (L/$D_{out}$) is in the range of 5 to 200, preferably 10 to 100. When the tubular oxide titanium particles having diameters, etc. of these ranges are used, a photovoltaic cell having excellent photoelectric conversion efficiency can be produced.

If the outer diameter ($D_{out}$) of the tubular titanium oxide particle is less than the lower limit of the above range, the inner diameter becomes less than 4 nm correspondingly, so that diffusion of the later-described electrolyte is insufficient, and satisfactory photoelectric conversion efficiency is not obtained occasionally.

It is difficult to obtain tubular titanium oxide particles having an outer diameter ($D_{out}$) of more than the upper limit of the above range.

If the inner diameter ($D_{in}$) of the tubular titanium oxide particle is less than the lower limit of the above range, sufficient photoelectric conversion efficiency is not obtained occasionally, as previously described.

It is difficult to obtain tubular titanium oxide particles having an inner diameter ($D_{in}$) of more than the upper limit of the above range, and the density of titanium oxide in the metal oxide semiconductor film is lowered, so that satisfactory photoelectric conversion efficiency is not obtained occasionally.

If the tube thickness is less than the lower limit of the above range, the thickness of the crystal layer is small and the function of the semiconductor becomes insufficient, so that satisfactory photoelectric conversion efficiency is not obtained occasionally.

If the tube thickness is more than the upper limit of the above range, the feature (effect) that the specific surface area is higher than that of conventional crystalline titanium oxide becomes less distinct, and correspondingly, the adsorption amount of the spectrosensitizing dye does not become sufficiently large, so that the effect of increasing photoelectric conversion efficiency sometimes becomes insufficient. If the length (L) of the tubular titanium oxide particle is less than the lower limit of the above range, the number of particles in the metal oxide semiconductor film is increased to thereby increase particle boundary resistance, so that sufficient photoelectric conversion efficiency is not obtained occasionally. If the length (L) of the tubular titanium oxide particle is more than the upper limit of the above range, diffusion of the electrolyte becomes insufficient and satisfactory photoelectric conversion efficiency is not obtained occasionally, though it depends upon the inner diameter of the tube. If the ratio of the length (L) of the tubular titanium oxide particle to the outer diameter ($D_{out}$) thereof, i.e., (L)/($D_{out}$) ratio, is less than the lower limit of the above range, adhesion of the resulting metal oxide semiconductor film to the electrode layer is lowered, and the strength of the film sometimes becomes insufficient. If the (L)/($D_{out}$) ratio is more than the upper limit of the above range, light scattering is increased or diffusion of the electrolyte becomes insufficient, so that satisfactory photoelectric conversion efficiency is not obtained occasionally.

The alkali metal content in the tubular titanium oxide particles used for the photovoltaic cell is preferably not more than 500 ppm, more preferably not more than 200 ppm, particularly preferably not more than 100 ppm.

If the alkali metal content is too high, the function of the semiconductor is lowered, and the photoelectric conversion efficiency tends to be lowered with time.

The tubular titanium oxide particles used for the photovoltaic cell of the invention may be particles of amorphous titanium oxide, but they are preferably particles of crystalline titanium oxide, such as anatase type titanium oxide, brookite type titanium oxide, rutile type titanium oxide, or their mixed crystal or eutectic crystal, and they are particularly preferably particles of anatase type titanium oxide or brookite type titanium oxide because of high band gap.

The crystal diameter of the anatase type titanium oxide and the brookite type titanium oxide is in the range of preferably 1 to 50 nm, more preferably 5 to 30 nm. When the crystal diameter is in this range, the adsorption amount of the photosensitizer is increased, and hence, a photovoltaic cell having excellent photoelectric conversion efficiency can be produced.

The crystal diameter of the anatase type titanium oxide primary particle can be determined by measuring a half band width of a peak of the (1.0.1) face, followed by calculation from the Debye-Scherrer's formula. The crystal diameter of the brookite type titanium oxide primary particle can be determined by measuring a half band width of a peak of the (1.1.1) face through X-ray diffractometry, followed by calculation from the Debye-Scherrer's formula. If the crystal diameter of the brookite type titanium oxide primary particle or the anatase type titanium oxide primary particle is less than the lower limit of the above range, electron mobility in the particle is deteriorated. If the crystal diameter thereof is more than the upper limit of the above range, the adsorption amount of the photosensitizer is decreased, and the photoelectric conversion efficiency is sometimes lowered.

In case of the eutectic crystal, crystal lattice constant, crystal form and crystal diameter can be determined by the field emission type transmission electron microscope photograph (FE-TEM) measurement.

The metal oxide semiconductor film 2 contains a titanium oxide binder component in addition to the tubular titanium oxide particles.

The titanium oxide binder component is, for example, peroxotitanic acid that is obtained by adding hydrogen peroxide to a sol or a gel of orthotitanic acid obtained through a sol-gel process to thereby dissolve hydrated titanic acid.

Particularly, a hydrolysis polycondensate of peroxotitanic acid is preferably employed.

The titanium oxide binder component forms a dense and uniform adsorption layer on the surface of the tubular titanium oxide particle. Therefore, adhesion of the resulting metal oxide semiconductor film to the electrode can be increased. By the use of the titanium oxide binder component, further, contact area of the tubular titanium oxide particles is increased, and thereby electron mobility can be enhanced or the adsorption amount of the photosensitizer can be increased.

The weight ratio (in terms of an oxide) of the titanium oxide binder component to the tubular titanium oxide particles (titanium oxide binder component/tubular titanium oxide particle) in the metal oxide semiconductor film 2 is desired to be in the range of 0.03 to 0.50, preferably 0.1 to 0.3. When the weight ratio is in this range, the adsorption amount of the photosensitizer is increased, and a desired porous semiconductor can be obtained. If the weight ratio is less than the lower limit of the above range (that is, the amount of the binder is small), visible light absorption is insufficient, and in some cases, the adsorption amount of the photosensitizer is not increased. If the weight ratio is more than the upper limit of the above range (that is, the amount of the binder is large), a porous semiconductor film is not obtained occasionally, and the adsorption amount of the photosensitizer is not increased in some cases.

The metal oxide semiconductor film 2 preferably has a pore volume of 0.1 to 0.8 ml/g and an average pore diameter of 2 to 250 nm. If the pore volume is less than the lower limit of the above range, the adsorption amount of the photosensitizer is decreased. If the pore volume is more than the upper limit of the above range, electron mobility in the film is deteriorated to sometimes lower the photoelectric conversion efficiency. If the average pore diameter is less than the lower limit of the above range, the adsorption amount of the photosensitizer is decreased. If the average pore diameter is more than the upper limit of the above range, electron mobility in the film is deteriorated to thereby lower the photoelectric conversion efficiency occasionally.

The metal oxide semiconductor film 2 can be prepared by the use of a coating solution for forming a metal oxide semiconductor film for a photovoltaic cell.

In the present invention, a photosensitizer is adsorbed on the metal oxide semiconductor film 2.

The photosensitizer is not specifically restricted provided that it absorbs light of visible region and/or infrared region and is excited. For example, organic dyes and metal complexes are employable.

Examples of the organic dyes employable herein include conventionally known organic dyes having functional groups, such as carboxyl group, hydroxyalkyl group, hydroxyl group, sulfone group and carboxyalkyl group, in their molecules. More specifically, there can be mentioned xanthene, coumarin, acridine, tetraphenylmethane, quinone, Eosin Y, dibromofluorescein, fluoroescein, fluorescin, metal-free phthalocyanine, cyanine dyes, metallocyanine dyes, triphenylmethane dyes, and xanthene dyes, such as Uranin, eosin, rose bengal, Rhodamine B and dibromofluorescein. These dyes have characteristics of a high rate of adsorption on the metal oxide semiconductor film.

Examples of the metal complexes include metal phthalocyanines, such as copper phthalocyanine and titanyl phthalocyanine; chlorophyll; hemin; ruthenium-cis-diacquo-bipyridyl complexes, such as ruthenium-tris(2,2'-bispyridyl-4,4'-dicarboxylate), cis-(SCN$^-$)-bis(2,2'-bipyridyl-4,4'-dicarboxylate) ruthenium and ruthenium-cis-diaquo-bis(2,2'-bipyridyl-4,4'-dicarboxoylate); porphyrin such as zinc-tetra (4-carboxyphenyl)porphyrin; and complexes of ruthenium, osmium, iron, zinc or the like, such as an iron-hexacyanide complex, as described in Japanese Patent Laid-Open Publication No. 220380/1989 and National Publication of International Patent No. 504023/1993. These metal complexes exhibit excellent spectrosensitizing effect and durability.

The above organic dyes and metal complexes may be used singly or as a mixture of two or more kinds, or the organic dyes and the metal complexes may be used in combination.

There is no specific limitation on the adsorption method of the photosensitizer, and methods generally used are adoptable. For example, the metal oxide semiconductor film is allowed to absorb a solvent solution of the photosensitizer by dipping, spinner method, spraying or the like and then dried. The absorption step may be repeated, when needed. The photosensitizer can also be adsorbed on the metal oxide semiconductor film by contacting the solution of the photosensitizer with the substrate while the solution is refluxed under heating.

The solvent for dissolving the photosensitizer has only to be a solvent capable of dissolving the photosensitizer, and examples of the solvents employable include water, alcohols, toluene, dimethylformamide, chloroform, ethyl cellosolve, N-methylpyrrolidone and tetrahydrofuran.

The amount of the photosensitizer adsorbed on the metal oxide semiconductor film is preferably not less than 50 μg based on 1 cm$^2$ of the specific surface area of the metal oxide semiconductor film. If the amount of the photosensitizer is small, the photoelectric conversion efficiency sometimes becomes insufficient.

The photovoltaic cell of the invention is produced by arranging the metal oxide semiconductor film 2 and the transparent electrode layer 3 so that they should face each other, sealing their sides with a resin or the like and enclosing an electrolyte 4 between the electrodes.

As the electrolyte 4, a mixture of an electrochemically active salt and at least one compound which forms an oxidation-reduction system is employed.

Examples of the electrochemically active salts include quaternary ammonium salts such as tetrapropylammonium iodide. Examples of the compounds which form an oxidation-reduction system include quinone, hydroquinone, iodine ($I^-/I_3^-$), potassium iodide, bromine ($Br^-/Br_3^-$) and potassium bromide.

In the present invention, a solid electrolyte may be used as the electrolyte. Examples of the solid electrolytes employable herein include CuI, CuBr, CuSCN, polyaniline, polypyrrole, polythiophene, arylamine type polymers, polymers having acrylic group and/or methacrylic group, polyvinyl carbazole, triphenyldiamine polymer, L-valine, derivative low-molecular gel, polyoligoethylene glycol methacrylate, poly(o-methoxy aniline), poly(epichlorohydrin-Co-ethylene oxide), 2,2', 7,7'-tetrakis(N,N-di-P-methoxyphenyl-amine)-9,9'-spirobifluorene, fluorine-type ion exchange resins having proton conductivity, such as perfluorosulfonate, perfluorocarbon copolymer, and perfluorocarbonsulfonic acid. In addition thereto, polyethylene oxide and a substance obtained by forming ion pair from, for example, imidazole cation and $Br^-$, $BF_4^-$ or $N-(SO_2CF_3)_2$ by an ion gel process and then adding a vinyl monomer or a PMMA monomer to perform polymerization are also preferably employed.

When the solid electrolyte is used, the electrolyte is not scattered differently from a liquid electrolyte, and therefore, photoelectric conversion efficiency is not lowered even if it is used for a long period of time, and besides the electrolyte does not cause corrosion or the like.

In the present invention, an electrolytic solution obtained by the use of a solvent may be used as the electrolyte 4, if desired. The solvent used herein is desired to have such a low dissolving power for the photosensitizer that the photosensitizer adsorbed on the metal oxide semiconductor film is not desorbed and not dissolved in the solution. Examples of such solvents include water, alcohols, oligoethers, carbonates such as propion carbonate, phosphoric acid esters, dimethylformamide, dimethyl sulfoxide, N-methylpyrrolidone, N-vinylpyrrolidone, sulfur compounds such as sulfolane 66, ethylene carbonate, and acetonitrile.

Coating Solution for Forming Metal Oxide Semiconductor Film for Photovoltaic Cell For forming the metal oxide semiconductor film 2 used in the invention, peroxotitanic acid as a precursor of a titanium oxide binder component and/or a titanium oxide particle dispersion sol having an average particle diameter of not more than 20 nm (sometimes referred to as a "titanium oxide binder component" hereinafter) and a coating solution for forming a metal oxide semiconductor film for a photovoltaic cell, which comprises tubular titanium oxide particles and a dispersion medium, are employed.

The peroxotitanic acid is prepared by adding hydrogen peroxide to an aqueous solution of a titanium compound or a sol or gel of hydrated titanium oxide and heating the mixture.

The sol or gel of hydrated titanium oxide is obtained by adding an acid or an alkali to an aqueous solution of a titanium compound to perform hydrolysis, and then if necessary, performing washing, heating and aging. The titanium compound used is not specifically restricted, but in particular, titanium halides, titanium salts, such as titanyl sulfate, titanium alkoxides, such as tetraalkoxytitanium, and titanium compounds, such as titanium hydride, are preferably employable.

The titanium oxide particle dispersion sol is prepared by, for example, further heating the peroxotitanic acid and aging it.

The weight ratio (in terms of an oxide) of the titanium oxide binder component to the tubular titanium oxide particles (titanium oxide binder component/tubular titanium oxide particles) in the coating solution for forming a metal oxide semiconductor film for a photovoltaic cell employable in the invention is desired to be in the range of 0.03 to 0.50, preferably 0.1 to 0.3. If the weight ratio is less than the lower limit of the above range, visible light absorption is insufficient, and in some cases, the adsorption amount of the photosensitizer is not increased. If the weight ratio is more than 0.50, a dense semiconductor film is not obtained occasionally, and besides the electron mobility is not improved in some cases.

In the coating solution for forming a metal oxide semiconductor film for a photovoltaic cell, the titanium oxide binder component and the tubular titanium oxide particles are desirably contained in a concentration of 1 to 30% by weight, preferably 2 to 20% by weight, in terms of an oxide.

As the dispersion medium, any of dispersion media capable of dispersing therein the titanium oxide binder component and the tubular titanium oxide particles and capable of being removed when dried is employable without limitation. Particularly preferable are alcohols.

In the coating solution for forming a metal oxide semiconductor film for a photovoltaic cell employable in the invention, a film forming aid may be contained, when needed. Examples of the film forming aids include polyethylene glycol, polyvinyl pyrrolidone, hydroxypropyl cellulose, polyacrylic acid and polyvinyl alcohol. When the film forming aid is contained in the coating solution, viscosity of the solution is increased, and thereby it becomes possible to obtain a uniformly dried film. Moreover, the tubular titanium oxide particles are densely filled to increase bulk density, and a metal oxide semiconductor film having high adhesion to the electrode can be obtained.

The process for producing a metal oxide semiconductor film for a photovoltaic cell according to the invention comprises applying the coating solution for forming a metal oxide semiconductor film for a photovoltaic cell onto a substrate, drying the coating layer and then curing the dried layer.

It is preferable to apply the coating solution in such a manner that the film thickness of the finally formed metal oxide semiconductor film is in the range of 0.1 to 50 μm. The coating solution can be applied by a conventional method, such as dipping, spinner method, spraying, roll coating, flexographic printing or screen printing.

The drying temperature has only to be a temperature at which the dispersion medium can be removed.

In the present invention, it is particularly preferable to irradiate the coating film with ultraviolet rays to cure the film. Although the irradiation dose of the ultraviolet rays varies depending upon the content of the peroxotitanic acid, etc., the film has only to be irradiated at a dose necessary to decompose and cure the peroxotitanic acid. When a film forming aid is contained in the coating solution, the film forming aid may be decomposed by heating after curing of the coating film.

In the present invention, after the coating film is cured by irradiation with ultraviolet rays, the film is preferably irradiated with ion of at least one gas selected from $O_2$, $N_2$, and inert gases of Group 0 of the periodic table, such as $H_2$, neon, argon and krypton, and then annealed.

For the ion irradiation, publicly known methods are adoptable. For example, a method of injecting boron or phosphorus into a silicon wafer in a given amount and a given depth in the production of IC or LSI can be adopted. Annealing is carried out by heating the film at a temperature of 200 to 500° C., preferably 250 to 400° C., for a period of 10 minutes to 20 hours.

By virtue of the gas ion irradiation, no ion remains in the titanium oxide film, and many defects are produced on the surfaces of titania particles, whereby the crystalline state of the titanium oxide crystals (including brookite type crystals) after the annealing is improved, and besides, bonding of particles is promoted. Consequently, the binding power to the photosensitizer is enhanced and the adsorption amount of the photosensitizer is increased. Further, by the promotion of particle bonding, the electron mobility is enhanced, and thereby photoelectric conversion efficiency can be enhanced.

The thickness of the metal oxide semiconductor film obtained above is preferably in the range of 0.1 to 50 μm.

Photocatalyst

The photocatalyst according to the present invention uses the aforesaid tubular titanium oxide particles. For the photocatalyst, the tubular titanium oxide particles can be used as they are, or they can be used after other active components are supported or doped thereon, or they can be used after they are mixed with other active components. The photocatalyst may further contain a binder component precursor, if necessary.

There is no specific limitation on the usage form of the photocatalyst. For example, the tubular titanium oxide particles may be dispersed as they are in a solvent such as water, or they may be mixed with a binder component precursor to prepare a coating solution for forming a photocatalyst layer, followed by application of the coating solution onto a substrate, such as glass, PET, metal or ceramic, and drying to form a catalyst layer having a desired thickness. Further, the tubular titanium oxide particles may be molded into spheres, pellets, honeycombs or the like.

Examples of the other active components include metal components used for the antibacterial or antifungal purpose, such as Ag, Cu and Zn, and metal components having oxidation-reduction ability, such as Pt, Pd, Rh, Ru, Os, Ir, Au and Fe. For supporting or doping these metal components, hitherto known methods are adoptable. For example, an aqueous solution of a metal component-soluble salt is added to a dispersion of the tubular titanium oxide particles, or if necessary, the resulting mixture is hydrolyzed to precipitate the metal.

As the coating solution for forming a photocatalyst layer, the same solution as the aforesaid coating solution for forming a metal oxide semiconductor film is employable.

Examples of the binder component precursors employable in the invention include inorganic metal salts or organic metal compounds, such as silicon tetrachloride, titanium tetrachloride, zirconium chloride, zinc chloride, tin chloride, tetraethoxysilane, tetraisopropoxytitanium, tetraisopropoxyzirconium, tetraisopropoxyzinc, tetraisopropoxyindium and tetraisopropoxytin; partial hydrolyzates thereof; and hydrolysis polycondensates thereof.

As the tubular titanium oxide particles used for the photocatalyst of the invention, the aforesaid tubular titanium oxide particles used for the photovoltaic cell are preferably employed.

The tubular titanium oxide particles desirably have an outer diameter ($D_{out}$) of 5 to 40 nm, preferably 10 to 30 nm, an inner diameter ($D_{in}$) of 4 to 30 nm, preferably 5 to 20 nm, a tube thickness of 1 to 20 nm, preferably 2 to 15 nm, a length (L) of 25 to 1000 nm, preferably 50 to 600 nm, and a length (L)/outer diameter ($D_{out}$) ratio ($L/D_{out}$) of 5 to 200, preferably 10 to 100. The tubular titanium oxide having diameters, etc. of these ranges are particularly preferable for a photocatalyst.

If the outer diameter ($D_{out}$) of the tubular titanium oxide particle is small, the inner diameter also becomes small correspondingly, so that diffusion of the reaction product becomes insufficient and satisfactory activity is not obtained occasionally, though it depends upon the type of the reaction. Even if the outer diameter ($D_{out}$) of the tubular titanium oxide particle is increased, light scattering takes place, so that utilization of light is lowered and sufficient activity is not obtained occasionally.

If the inner diameter ($D_{in}$) of the tubular titanium oxide particle is small, diffusion of the reaction product becomes insufficient and satisfactory activity is not obtained occasionally, though it depends upon the type of the reaction.

It is difficult to obtain tubular titanium oxide particles having an inner diameter ($D_{in}$) of large value, and even if they are obtained, the outer diameter ($D_{out}$) also becomes large correspondingly, and hence sufficient activity is not obtained occasionally because of light scattering.

If the tube thickness is small, the thickness of the crystal layer also becomes small, and sufficient activity is not obtained occasionally because of insufficient production of electron holes.

Even if the tube thickness is increased, the feature that the specific surface area is higher than that of conventional crystalline titanium oxide becomes less distinct, so that the number of effective active sites, adsorption points of the reaction product, etc. is not satisfactorily large, and the effect of increasing photocatalytic activity sometimes becomes insufficient.

If the length (L) of the tubular titanium oxide particle is short, sufficient activity is not obtained occasionally in case of rate-limiting reactions, though it depends upon the type of reaction. If the length (L) of the tubular titanium oxide particle is too long, diffusion of the reaction product becomes insufficient and satisfactory activity is not obtained occasionally, though it depends upon the inner diameter of the tube and the type of the reaction.

If the ratio of the length (L) of the tubular titanium oxide particle to the outer diameter ($D_{out}$) thereof, i.e., $(L)/(D_{out})$ ratio, is less than the lower limit of the above range, adhesion of a catalyst film to a substrate or strength of the film sometimes becomes insufficient in the case where the catalyst film is formed on the substrate.

If the $(L)/(D_{out})$ ratio is more than the upper limit of the above range, diffusion of the reaction product becomes insufficient and satisfactory photocatalytic activity is not obtained occasionally, though it depends upon the type of the reaction.

The alkali metal content in the tubular titanium oxide particles is preferably not more than 500 ppm, more preferably not more than 200 ppm, particularly preferably not more than 100 ppm.

If the alkali metal content is high, production of electron holes or electron mobility is deteriorated, and sufficient photocatalytic activity is not obtained occasionally.

Examples of catalytic reactions using the photocatalyst of the invention include reduction of nitrogen oxide, reduction fixation of carbon dioxide, decomposition of organic matters or environmental hormones in polluted waste water, isomerization of olefins, photodecomposition of water, antifouling reaction, antifungal reaction, antibacterial reaction and deodorization reaction.

When the tubular titanium oxide particles are used for the photocatalyst, a binder [B] composed of (b-1) titanium peroxide or (b-2) composite titanium peroxide, and (b-3) an organic high-molecular weight compound may be used to form a film consisting of the tubular titanium oxide particles [A] and the binder [B] on the substrate surface.

The titanium peroxide (b-1) is a compound usually represented by $TiO_3 \cdot nH_2O$. The titanium peroxide (b-1) can be obtained by reacting a titanium compound, such as a salt of titanium tetrachloride, titanium hydroxide, titanium alkoxide or a titanium complex of acetylacetonato, with a peroxide, such as hydrogen peroxide.

The composite titanium peroxide (b-2) is a peroxide of composite metals composed of Ti and one or more elements selected from the group consisting of Cu, Ag, Zn, Cd, Al, Zr, Si, Sn, V, Nb, Sb, Bi, Cr, Mo, W, Mn and Fe (referred to as "element(s) (b)" hereinafter), and is a compound wherein a part of Ti atoms of the titanium peroxide (b-1) are replaced with the elements (b) other than titanium.

The composite titanium peroxide (b-2) can be obtained by reacting the aforesaid titanium compound with a compound, such as a salt, hydroxide, alkoxide or acetylacetonato complex of an element other than titanium, and a peroxide, such as hydrogen peroxide. For example, hydrogen peroxide is added to a water/alcohol solution of isopropoxytitanium and isopropoxyzirconium, and the mixture is subjected to heat treatment, whereby a composite peroxide of titanium and zirconium is obtained. The titanium peroxide (b-1) or the composite titanium peroxide (b-2) is usually in the state of a solution.

Since the titanium peroxide (b-1) or the composite titanium peroxide (b-2) has a refractive index almost the same as that of the aforesaid tubular titanium oxide particles, light scattering due to the film forming components is decreased, and a film of excellent transparency can be formed.

Especially when a composite peroxide of Ti and Zr and/or Si is used as the titanium peroxide or the composite titanium peroxide, adhesion to the substrate and affinity for the organic solvent are greatly improved, so that use of the composite peroxide is preferable.

The titanium peroxide or the composite titanium peroxide may be reacted with organic amine or acetylacetone prior to use. When a transparent coating film is formed by the use of a coating solution containing the above peroxide as a binder, the peroxide is decomposed in the heat treatment of the film forming process, and thereby densification of the film can be accelerated. When the titanium peroxide or the composite titanium peroxide is contained as a binder, the binder itself comes to have photocatalytic activity and conductivity. Therefore, the photocatalytic activation is promoted to thereby enhance photocatalytic activity of the resulting film. Further, because the refractive index of the binder is almost the same as that of the composite titanium oxide fine particles, it is possible to form a coating film having high transparency and low haze. Moreover, even if the film is treated at a low temperature of about 150° C., hardening of the film is feasible. Hence, a film having excellent adhesion to a substrate of glass, plastic or the like can be formed, and besides a film having a thickness of about 1 µm can be easily formed by one coating.

The organic high-molecular weight compound (b-3) contained in the binder is preferably polysaccharide such as chitosan or cellulose. When the organic high-molecular weight compound (b-3) is contained in the binder, stress accompanying shrinkage of the coating film in the drying step of the film forming process is relaxed to prevent cracking of the film, and hence it becomes possible to increase the film thickness. Moreover, wettability of the substrate by the coating solution is increased, and viscosity of the coating solution is also increased. Hence, workability of the coating process can be improved.

In order to form a coating film on the substrate surface to prepare a photocatalyst, the tubular titanium oxide fine particles [A] and the binder [B] are dissolved or dispersed in a solvent consisting of water and/or an organic solvent to prepare a coating solution for forming a transparent coating film. Then, the coating solution is applied onto a surface of a substrate, such as glass, plastic, ceramic or fiber, by a usual method, such as spinner method, bar coating, spraying, dipping or flexographic method, then dried and cured under heating at 150 to 400° C. For the curing treatment, ultraviolet irradiation may be used in combination. The thickness of the transparent coating film is desired to be in the range of about 0.1 to 10 µm, preferably 0.2 to 5 µm.

The tubular titanium oxide particles used in the present invention have such constitutions as previously described and have a high specific surface area of 200 to 600 $m^2/g$, so that large amounts of sensor molecules can be adsorbed. Therefore, these particles can be favorably used as detective parts of an optical sensor even if extremely weak light is used.

Further, because the tubular titanium oxide particles have the aforesaid $(L)/(D_{out})$ ratio and tube thickness, the light transmission of the particles is excellent, and moving of electron holes in the particle rapidly takes place, differently from the case of using extremely fine titanium oxide particles. Therefore, an optical sensor having high detection accuracy can be obtained.

Furthermore, because the tubular titanium oxide particles have the aforesaid constitutions, they are useful as negative pole materials of batteries by introducing Li into them.

According to the present invention, a water dispersion sol of titanium oxide particles and/or titanium oxide type composite oxide particles comprising titanium oxide and/or an oxide other than titanium oxide, said particles functioning titanium oxide source and having specific particle diameter, is used. Therefore, it is unnecessary to calcine the titanium oxide source at a high temperature to crystallize it, and tubular titanium oxide containing small amounts of agglomerates and having uniform particle shape and a low content of residual alkali metal can be obtained in a high yield. Accordingly, a process for preparing tubular titanium oxide particles which are useful as starting substances of functional materials, such as catalysts, catalyst carriers, photocatalysts, decorative materials, optical materials and photoelectric conversion materials, and such tubular titanium oxide particles can be provided. The reduction type tubular titanium oxide particles are useful as catalysts, adsorbents, photocatalysts, optical materials, photoelectric conversion materials, etc., and besides, they are effectively used for proton conductive materials, electrolyte films for fuel cells and other conductive materials because they have conductivity.

According to the present invention, the above-mentioned tubular titanium oxide particles are used for a metal oxide semiconductor film. Therefore, the adsorption amount of a photosensitizer on the metal oxide semiconductor film is large, diffusion of the electrolyte is excellent, and the content of alkali metal is extremely low. Hence, a photovoltaic cell improved in the photoelectric conversion efficiency and useful for various photoelectric conversion systems can be obtained. Further, a photocatalyst having an extremely low content of alkali metal, exhibiting excellent diffusion of reaction products or other products and having high activity can be obtained. The tubular titanium oxide particles are useful not only as photovoltaic cells and photocatalysts but also as negative pole materials of batteries and detective parts of optical sensors.

EXAMPLES

The present invention is further described with reference to the following examples, but it should be construed that the invention is in no way limited to those examples.

Example A1

Preparation of Titanium Oxide Particle (T-1) Dispersion

A titanium chloride aqueous solution was diluted with pure water to prepare a titanium chloride aqueous solution having a concentration (in terms of $TiO_2$, referred to as "$TiO_2$ concentration" hereinafter) of 5% by weight. The aqueous solution was added to ammonia water having a concentration of 15% by weight and having been controlled to a temperature of 5° C. to perform neutralization and hydrolysis. After the addition of the titanium chloride aqueous solution, the resulting gel had pH of 10.5. Then, the gel was washed by filtration to obtain a gel of orthotitanic acid having a $TiO_2$ concentration of 9% by weight.

Thereafter, 100 g of the gel of orthotitanic acid was dispersed in 2900 g of pure water, then 800 g of hydrogen peroxide water having a concentration of 35% by weight was added, and with stirring, the mixture was heated at 85° C. for 3 hours to prepare a peroxotitanic acid aqueous solution. The peroxotitanic acid aqueous solution obtained had a $TiO_2$ concentration of 0.5% by weight. As the dispersion medium, water was used.

Subsequently, the resulting solution was heated at 95° C. for 10 hours to give a titanium oxide particle dispersion, and to the titanium oxide particle dispersion, tetramethylammonium hydroxide (TMAH, MW: 149.2) was added in such an amount that the molar ratio of TMAH to $TiO_2$ in the dispersion became 0.016. The resulting dispersion had pH of 11. Then, the dispersion was subjected to hydrothermal treatment at 230° C. for 5 hours to prepare a titanium oxide particle (T-1) dispersion. An average particle diameter of the titanium oxide particles (T-1) is set forth in Table 1.

Preparation of Tubular Titanium Oxide Particles (PT-1-1)

To the titanium oxide particle (T-1) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours.

The resulting particles were sufficiently washed with pure water. The amount of residual $Na_2O$ was 0.9% by weight. Then, alkali was decreased by the use of a cation exchange resin to prepare tubular titanium oxide particles (PT-1-1). The amount of residual $Na_2O$ in the resulting particles (PT-1-1) was analyzed. Further, the crystalline state of the particles was measured by X-ray diffractometry and evaluated based on the following criteria.

The results are set forth in Table 1. The crystal type (crystal form) of the resulting particles (PT-1-1) was anatase type.

Criteria

Evaluation was made based on the height of a peak at a lattice constant d of 1.89.

AA: The peak is obviously higher than that of the tubular titanium oxide particles (PT1-1).

BB: The peak is almost the same as that of the tubular titanium oxide particles (PT1-1).

CC: The peak is obviously lower than that of the tubular titanium oxide particles (PT1-1).

DD: The particles are substantially amorphous.

Example A2

Preparation of Tubular Titanium Oxide Particles (PT-1-2)

To a water dispersion ($TiO_2$ concentration: 5% by weight) of the tubular titanium oxide particles (PT) obtained in Example A1, tetramethylammonium hydroxide was added as an organic base in such an amount that the molar ratio of TMAH to $TiO_2$ became 0.1. The resulting dispersion had pH of 13.2. Then, the dispersion was subjected to hydrothermal treatment at 190° C. for 5 hours to prepare tubular titanium oxide particles (PT-1-2). The resulting tubular titanium oxide particles (PT-1-2) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 1.

Example A3

Preparation of Tubular Titanium Oxide Particles (PT-2-1)

To a titanium oxide particle (T-1) dispersion prepared in the same manner as in Example A1, 40 g of a NaOH aqueous solution having a concentration of 40% by weight and 358 g of a tetramethylammonium hydroxide (TMAH) aqueous solution having a concentration of 25% by weight were added in such a manner that the molar ratio $[(A_M)+(OB_M)]/(T_M)$ of the total of the number of moles $(A_M)$ of the alkali metal hydroxide and the number of moles $(OB_M)$ of the organic base to the number of moles $(T_M)$ of $TiO_2$ became 10, and the mixture was subjected to hydrothermal treatment at 150° C. for 2 hours. The resulting particles were sufficiently washed with pure water. The amount of residual $Na_2O$ was 0.3% by weight. Then, alkali was decreased by the use of a cation exchange resin to prepare tubular titanium oxide particles (PT-2-1). The amount of residual $Na_2O$ in the resulting particles (PT-2-1) was analyzed, and the crystalline state of the particles was measured by X-ray diffractometry.

The results are set forth in Table 1.

Example A4

Preparation of Tubular Titanium Oxide Particles (PT-2-2)

To a water dispersion ($TiO_2$ concentration: 5% by weight) of the tubular titanium oxide particles (PT-2-1) obtained in Example A3, tetramethylammonium hydroxide (TMAH) was added as an organic base in such an amount that the molar ratio of TMAH to $TiO_2$ became 0.1. The resulting dispersion had pH of 13.0. Then, the dispersion was subjected to hydrothermal treatment at 230° C. for 5 hours to prepare tubular titanium oxide particles (PT-2-2).

The resulting tubular titanium oxide particles (PT-2-2) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

Example A5

Preparation of Titanium Oxide Type Composite Oxide Particle (T-3) Dispersion

A peroxotitanic acid aqueous solution ($TiO_2$ concentration: 0.5% by weight) of 3800 g was prepared in the same manner as in Example A1. The aqueous solution was mixed with 7.0 g of a silica sol (available from Catalysts & Chemicals Industries Co., Ltd., SI-350, $SiO_2$ concentration: 30% by weight, average particle diameter: 8 nm), and the mixture was heated at 95° C. for 3 hours to prepare a titanium oxide type composite oxide particle (T-3) dispersion having a $TiO_2.SiO_2$ concentration of 0.56% by weight. An average particle diameter of the oxide particles (T-3) is set forth in Table 1.

Preparation of Tubular Titanium Oxide Particles (PT-3-1)

To the titanium oxide type composite oxide particle (T-3) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours. The resulting particles were sufficiently washed with pure water. The amount of residual $Na_2O$ was 1.5% by weight.

Then, alkali was decreased by the use of a cation exchange resin to prepare tubular titanium oxide particles (PT-3-1). The amount of residual $Na_2O$ in the resulting particles (PT-3-1) was analyzed, and the crystalline state of the particles was measured by X-ray diffractometry.

The results are set forth in Table 1.

Example A6

Preparation of Tubular Titanium Oxide Particles (PT-3-2)

To a water dispersion ($TiO_2.SiO_2$ concentration: 3% by weight) of the tubular titanium oxide particles (PT-3-1) obtained in Example A5, tetramethylammonium hydroxide (TMAH) was added as an organic base in such an amount that the molar ratio of TMAH to $TiO_2$ became 0.1. The resulting dispersion had pH of 13.0. Then, the dispersion was subjected to hydrothermal treatment at 230° C. for 5 hours to prepare tubular titanium oxide particles (PT-3-2).

The resulting tubular titanium oxide particles (PT-3-2) were washed with water and dried. Then, alkali and $SiO_2$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

Example A7

Preparation of Titanium Oxide Type Composite Oxide Particle (T-4) Dispersion

A peroxotitanic acid aqueous solution ($TiO_2$ concentration: 0.5% by weight) of 3800 g was prepared in the same manner as in Example A1. The aqueous solution was mixed with 15.8 g of a silica sol (available from Catalysts & Chemicals Industries Co., Ltd., SI-550, $SiO_2$ concentration: 30% by weight, average particle diameter: 8 nm), and the mixture was heated at 95° C. for 3 hours to prepare a titanium oxide type composite oxide particle (T-4) dispersion having a $TiO_2.SiO_2$ concentration of 0.62% by weight. An average particle diameter of the oxide particles (T-4) is set forth in Table 1.

Preparation of Tubular Titanium Oxide Particles (PT-4-1)

To the titanium oxide type composite oxide particle (T-4) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours. The resulting particles were sufficiently washed with pure water. The amount of residual $Na_2O$ was 2.0% by weight. Then, alkali was decreased by the use of a cation exchange resin to prepare tubular titanium oxide particles (PT-4-1). The amount of residual $Na_2O$ in the resulting particles (PT-4-1) was analyzed, and the crystalline state of the particles was measured by X-ray diffractometry.

The results are set forth in Table 1.

Example A8

Preparation of Tubular Titanium Oxide Particles (PT-4-2)

To a water dispersion ($TiO_2.SiO_2$ concentration: 3% by weight) of the tubular titanium oxide particles (PT-4-1) obtained in Example A7, tetramethylammonium hydroxide (TMAH) was added as an organic base in such an amount that the molar ratio of TMAH to $TiO_2$ became 0.1. The resulting dispersion had pH of 13.5. Then, the dispersion was subjected to hydrothermal treatment at 230° C. for 5 hours to prepare tubular titanium oxide particles (PT-4-2).

The resulting tubular titanium oxide particles (PT-4-2) were washed with water and dried. Then, alkali and $SiO_2$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

Example A9

Preparation of Titanium Oxide Type Composite Oxide Particle (T-5) Dispersion

A peroxotitanic acid aqueous solution ($TiO_2$ concentration: 0.5% by weight) of 3800 g was prepared in the same manner as in Example A1. The aqueous solution was mixed with 21 g of an alumina sol (available from Catalysts & Chemicals Industries Co., Ltd., AS-2, $Al_2O_3$ concentration: 10% by weight); and the mixture was heated at 95° C. for 3 hours to prepare a titanium oxide type composite oxide particle (T-5) dispersion having a $TiO_2.Al_2O_3$ concentration of 0.55% by weight. An average particle diameter of the oxide particles (T-5) is set forth in Table 1.

Preparation of Tubular Titanium Oxide Particles
(PT-5-1)

To the titanium oxide type composite oxide particle (T-5) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours. The resulting particles were sufficiently washed with pure water. The amount of residual $Na_2O$ was 1.6% by weight. Then, alkali was decreased by the use of a cation exchange resin to prepare tubular titanium oxide particles (PT-5-1). The amount of residual $Na_2O$ in the resulting particles (PT-5-1) was analyzed, and the crystalline state of the particles was measured by X-ray diffractometry.

The results are set forth in Table 1.

Example A10

Preparation of Tubular Titanium Oxide Particles
(PT-5-2)

To a water dispersion ($TiO_2.Al_2O_3$ concentration: 3% by weight) of the tubular titanium oxide particles (PT-5-1) obtained in Example A9, tetramethylammonium hydroxide (TMAH) was added as an organic base in such an amount that the molar ratio of TMAH to $TiO_2$ became 0.1. The resulting dispersion had pH of 13.2. Then, the dispersion was subjected to hydrothermal treatment at 230° C. for 5 hours to prepare tubular titanium oxide particles (PT-5-2).

The resulting tubular titanium oxide particles (PT-5-2) were washed with water and dried. Then, alkali and $Al_2O_3$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

Example A11

Preparation of Titanium Oxide Type Composite Oxide Particle (T-6) Dispersion

A peroxotitanic acid aqueous solution ($TiO_2$ concentration: 0.5% by weight) of 3800 g was prepared in the same manner as in Example A1. The aqueous solution was mixed with 19 g of a zirconia sol prepared in the following manner, and the mixture was heated at 95° C. for 3 hours to prepare a titanium oxide type composite oxide particle (T-6) dispersion having a $TiO_2.ZrO_2$ concentration of 0.52% by weight. An average particle diameter of the oxide particles (T-6) is set forth in Table 1.

Preparation of Zirconia Sol

In a flask equipped with a dry distillation device, 5 kg of a zirconium chloride aqueous solution containing 0.036% by weight of zirconium chloride was placed, and with sufficient stirring, 290 g of 0.1 N ammonia water was slowly added. The resulting solution was heated at 95° C. for 50 hours to obtain an opaque white sol having a $ZrO_2$ concentration of 0.034% by weight and pH of 1.8. Then, 0.1 N ammonia water was further added to adjust pH to 4.8, and the resulting solution was washed with ion exchange water until no chlorine ion was detected in the filtrate to prepare a zirconia sol (average particle diameter: 50 nm) having a $ZrO_2$ concentration of 5% by weight as a dispersion.

Preparation of Tubular Titanium Oxide Particles
(PT-6-1)

To the titanium oxide particle (T-6) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours. The resulting particles were sufficiently washed with pure water. The amount of residual $Na_2O$ was 1.7% by weight. Then, alkali was decreased by the use of a cation exchange resin to prepare tubular titanium oxide particles (PT-6-1). The amount of residual $Na_2O$ in the resulting particles (PT-6-1) was analyzed, and the crystalline state of the particles was measured by X-ray diffractometry.

The results are set forth in Table 1.

Example A12

Preparation of Tubular Titanium Oxide Particles
(PT-6-2)

To a water dispersion ($TiO_2.ZrO_2$ concentration: 3% by weight) of the tubular titanium oxide particles (PT-6-1) obtained in Example A11, tetramethylammonium hydroxide (TMAH) was added as an organic base in such an amount that the molar ratio of TMAH to $TiO_2$ became 0.1. The resulting dispersion had pH of 13.5. Then, the dispersion was subjected to hydrothermal treatment at 230° C. for 5 hours to prepare tubular titanium oxide particles (PT-6-2).

The resulting tubular titanium oxide particles (PT-6-2) were washed with water and dried. Then, alkali and $ZrO_2$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

Example A13

Preparation of Tubular Titanium Oxide Particles
(PT-1-2)

To a water dispersion ($TiO_2$ concentration: 5% by weight) of the tubular titanium oxide particles (PT-1-1) obtained in Example A1, citric acid was added as an organic base in such an amount that the molar ratio of citric acid to $TiO_2$ became 3.0. The resulting dispersion had pH of 3.0. Then, the dispersion was subjected to hydrothermal treatment at 190° C. for 5 hours to prepare tubular titanium oxide particles (PT-1-13).

The resulting tubular titanium oxide particles (PT-1-13) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

Comparative Example A1

Preparation of Titanium Oxide Particle (T-7) Dispersion

A titanium oxide particle (T-1) dispersion prepared in the same manner as in Example A1 was dried and then calcined at 600° C. for 2 hours. The calcined product was pulverized to obtain a titanium oxide powder having an average particle diameter of 200 nm. Then, the powder was dispersed in water to prepare a titanium oxide particle (T-7) dispersion having a $TiO_2$ concentration of 10% by weight.

Preparation of Tubular Titanium Oxide Particles (PT-7-1)

To the titanium oxide particle (T-7) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours. The resulting particles were sufficiently washed with pure water. The amount of residual $Na_2O$ was 2.5% by weight. Then, alkali was decreased by the use of a cation exchange resin to prepare tubular titanium oxide particles (PT-7-1). The amount of residual $Na_2O$ in the resulting particles (PT-7-1) was analyzed, and the crystalline state of the particles was measured by X-ray diffractometry.

The results are set forth in Table 1.

Comparative Example A2

Preparation of Tubular Titanium Oxide Particles (PT-7-2)

To a water dispersion ($TiO_2$ concentration: 3% by weight) of the tubular titanium oxide particles (PT-7-1) obtained in Example A1, tetramethylammonium hydroxide (TMAH) was added as an organic base in such an amount that the molar ratio of TMAH to $TiO_2$ became 0.1. The resulting dispersion had pH of 13.2. Then, the dispersion was subjected to hydrothermal treatment at 230° C. for 5 hours to prepare tubular titanium oxide particles (PT-7-2).

The resulting tubular titanium oxide particles (PT-7-2) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

Comparative Example A3

Preparation of Titanium Oxide Type Composite Oxide Particle (T-8) Dispersion A titanium oxide type composite oxide particle (T-8) dispersion prepared in the same manner as in Example A5 was dried and then calcined at 600° C. for 2 hours. The calcined product was pulverized to obtain a titanium oxide powder having an average particle diameter of 300 nm. Then, the powder was dispersed in water to prepare a titanium oxide type composite oxide particle (T-8) dispersion having a $TiO_2 \cdot SiO_2$ concentration of 10% by weight.

Preparation of Tubular Titanium Oxide Particles (PT-8-1)

To the titanium oxide type composite oxide particle (T-8) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours. The resulting particles were sufficiently washed with pure water. The amount of residual $Na_2O$ was 5.0% by weight. Then, alkali was decreased by the use of a cation exchange resin to prepare tubular titanium oxide particles (PT-8-1). The amount of residual $Na_2O$ in the resulting particles (PT-8-1) was analyzed.

The results are set forth in Table 1.

Comparative Example A4

Preparation of Tubular Titanium Oxide Particles (PT-8-2)

To a water dispersion ($TiO_2$ concentration: 3% by weight) of the tubular titanium oxide particles (PT-8-1) obtained in Comparative Example A3, tetramethylammonium hydroxide (TMAH) was added as an organic base in such an amount that the molar ratio of TMAH to $TiO_2$ became 0.1. The resulting dispersion had pH of 13.2. Then, the dispersion was subjected to hydrothermal treatment at 230° C. for 5 hours to prepare tubular titanium oxide particles (PT-8-2).

The resulting tubular titanium oxide particles (PT-8-2) were washed with water and dried. Then, alkali and $SiO_2$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated.

The results are set forth in Table 1.

TABLE 1

| | Titanium oxide type particle dispersion | | | | First hydrothermal treatment | | | | | | |
|---|---|---|---|---|---|---|---|---|---|---|---|
| | Type of oxide | Composition | Average particle diameter (nm) | Solids concentration (wt. %) | Type of alkali | $A_H/T_H$ molar ratio | pH | Temperature (° C.) | Time (hr) | $Na_2O$ after water washing[1] (wt. %) | IE resin $Na_2O$[2] (wt. %) |
| Ex. A1 | $TiO_2$ | 100 | 30 | 0.5 | NaOH | 10 | 14 or more | 150 | 2 | 0.9 | 0.15 |

TABLE 1-continued

| | | | | | | | | | | | |
|---|---|---|---|---|---|---|---|---|---|---|---|
| Ex. A2 | TiO$_2$ | 100 | 30 | 0.5 | NaOH | 10 | 14 or more | 150 | 2 | 0.9 | 0.15 |
| Ex. A3 | TiO$_2$ | 100 | 30 | 0.5 | NaO TMAH | 10 | 14 or more | 150 | 2 | 0.3 | 0.12 |
| Ex. A4 | TiO$_2$ | 100 | 30 | 0.5 | NaO TMAH | 10 | 14 or more | 150 | 2 | 0.3 | 0.12 |
| Ex. A5 | TiO$_2$•SiO$_2$ | 90/10 | 20 | 0.5 | NaOH | 10 | 14 or more | 150 | 2 | 1.5 | 0.45 |
| Ex. A6 | TiO$_2$•SiO$_2$ | 90/10 | 20 | 0.5 | NaOH | 10 | 14 or more | 150 | 2 | 1.5 | 0.45 |
| Ex. A7 | TiO$_2$•SiO$_2$ | 80/20 | 10 | 0.5 | NaOH | 10 | 14 or more | 150 | 2 | 2.0 | 0.50 |
| Ex. A8 | TiO$_2$•SiO$_2$ | 80/20 | 10 | 0.5 | NaOH | 10 | 14 or more | 150 | 2 | 2.0 | 0.50 |
| Ex. A9 | TiO$_2$•Al$_2$O$_3$ | 90/10 | 20 | 0.5 | NaOH | 10 | 14 or more | 150 | 2 | 1.6 | 0.50 |
| Ex. A10 | TiO$_2$•Al$_2$O$_3$ | 90/10 | 20 | 0.5 | NaOH | 10 | 14 or more | 150 | 2 | 1.6 | 0.50 |
| Ex. A11 | TiO$_2$•ZrO$_2$ | 95/5 | 10 | 0.5 | NaOH | 10 | 14 or more | 150 | 2 | 1.7 | 0.30 |
| Ex. A12 | TiO$_2$•ZrO$_2$ | 95/5 | 10 | 0.5 | NaOH | 10 | 14 or more | 150 | 2 | 1.7 | 0.30 |
| Ex. A13 | TiO$_2$ | 100 | 30 | 0.5 | NaOH | 10 | 14 or more | 150 | 2 | 0.9 | 0.15 |
| Comp. Ex. A1 | TiO$_2$ | 100 | 200 | 10 | NaOH | 10 | 14 or more | 150 | 2 | 2.5 | 0.60 |
| Comp. Ex. A2 | TiO$_2$ | 100 | 200 | 10 | NaOH | 10 | 14 or more | 150 | 2 | 2.5 | 0.60 |
| Comp. Ex. A3 | TiO$_2$•SiO$_2$ | 85/15 | 300 | 10 | NaOH | 10 | 14 or more | 150 | 2 | 5.0 | 0.70 |
| Comp. Ex. A4 | TiO$_2$•SiO$_2$ | 85/15 | 300 | 10 | NaOH | 10 | 14 or more | 150 | 2 | 5.0 | 0.70 |

| | Second hydrothermal treatment | | | | Tubular titanium oxide particles | | | | | | |
|---|---|---|---|---|---|---|---|---|---|---|---|
| | Type of base | pH | Temperature (° C.) | Time (hr) | Na$_2$O after water washing[1] (ppm) | Average particle length (nm) | Average tube outer diameter (nm) | Average tube inner diameter (nm) | Crystalline state | | Specific surface area (m$^2$/g) | Mo$_x$[3] (wt. %) |
| Ex. A1 | | | | | | 180 | 10 | 7.5 | anatase | —[4] | 450 | — |
| Ex. A2 | TMAH | 13.2 | 190 | 5 | 50 | 180 | 10 | 7.5 | anatase | AA | 450 | — |
| Ex. A3 | | | | | | 175 | 10 | 7.5 | anatase | BB | 450 | — |
| Ex. A4 | TMAH | 13.0 | 230 | 5 | 10 | 175 | 10 | 7.5 | anatase | AA | 400 | — |
| Ex. A5 | | | | | | 145 | 10 | 7.5 | anatase | BB | 400 | 3 |
| Ex. A6 | TMAH | 13.0 | 230 | 5 | 100 | 145 | 10 | 7.5 | anatase | AA | 500 | 3 |
| Ex. A7 | | | | | | 225 | 10 | 7.5 | anatase | BB | 500 | 6 |
| Ex. A8 | TMAH | 13.5 | 230 | 5 | 200 | 225 | 10 | 7.5 | anatase | AA | 450 | 6 |
| Ex. A9 | | | | | | 175 | 10 | 7.5 | anatase | BB | 450 | 3 |
| Ex. A10 | TMAH | 13.2 | 230 | 5 | 200 | 175 | 10 | 7.5 | anatase | AA | 450 | 3 |
| Ex. A11 | | | | | | 175 | 10 | 7.5 | anatase | BB | 450 | 4 |
| Ex. A12 | TMAH | 13.5 | 230 | 5 | 100 | 175 | 10 | 7.5 | anatase | AA | 500 | 4 |
| Ex. A13 | citric acid | 3.0 | 190 | 5 | 30 | 180 | 10 | 7.5 | anatase | AA | 450 | — |
| Comp. Ex. A1 | | | | | | 375 | 10 | 7.5 | anatase + Am | CC | 450 | — |
| Comp. Ex. A2 | TMAH | 13.2 | 230 | 5 | 1100 | 375 | 10 | 7.5 | anatase + Am | CC | 450 | — |
| Comp. Ex. A3 | | | | | | 375 | 10 | 7.5 | anatase + Am | CC | 500 | — |
| Comp. Ex. A4 | TMAH | 13.2 | 230 | 5 | 1600 | 375 | 10 | 7.5 | anatase + Am | CC | 500 | — |

Notes:
In A$_H$, an organic base O$_H$ is included.
[1] NaO$_2$ after water washing means an amount (in terms of oxide) of sodium in the particles obtained by washing with water after hydrothermal treatment.
[2] IE resin NaO$_2$ means an amount (in terms of oxide) of sodium in the particles obtained by conducting ion exchange resin treatment after washing with water.
[3] Mo$_x$ means a content of a metal oxide other than titanium oxide.
[4] The crystal state was not evaluated because it was used as a criterion.

Example B1

Preparation of Titanium Oxide Particle (T-1) Dispersion

A titanium chloride aqueous solution was diluted with pure water to prepare a titanium chloride aqueous solution having a $TiO_2$ concentration of 5% by weight. The aqueous solution was added to ammonia water having a concentration of 15% by weight and having been controlled to a temperature of 5° C. to perform neutralization and hydrolysis. After the addition of the titanium chloride aqueous solution, the resulting gel had pH of 10.5. Then, the gel was washed by filtration to obtain a gel of orthotitanic acid having a $TiO_2$ concentration of 9% by weight.

Thereafter, 100 g of the gel of orthotitanic acid was dispersed in 2900 g of pure water, then 800 g of hydrogen peroxide water having a concentration of 35% by weight was added, and with stirring, the mixture was heated at 85° C. for 3 hours to prepare a peroxotitanic acid aqueous solution. The peroxotitanic acid aqueous solution obtained had a $TiO_2$ concentration of 0.5% by weight.

Subsequently, the resulting solution was heated at 95° C. for 10 hours to give a titanium oxide particle dispersion, and to the titanium oxide particle dispersion, tetramethylammonium hydroxide (TMAH, MW: 149.2) was added in such an amount that the molar ratio of TMAH to $TiO_2$ in the dispersion became 0.016. The resulting dispersion had pH of 11. Then, the dispersion was subjected to hydrothermal treatment at 230° C. for 5 hours to prepare a titanium oxide particle (T-1) dispersion. An average particle diameter of the titanium oxide particles (T-1) is set forth in Table 2.

Preparation of Reduction Type Tubular Titanium Oxide Particles (RPT-1)

To the titanium oxide particle (T-1) dispersion, 70 g of a KOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours (first hydrothermal treatment).

The resulting particles were sufficiently washed with pure water. The amount of residual $K_2O$ was 0.9% by weight. After washing with pure water, a water dispersion ($TiO_2$ concentration: 5% by weight) of the tubular titanium oxide particles was prepared. To the water dispersion, a cation exchange resin and an anion exchange resin were added in the same amount as that of the tubular titanium oxide particles, and the mixture was treated at 60° C. for 24 hours to perform high purification such as removal of alkali.

Then, freeze drying was carried out to obtain tubular titanium oxide particles (PT-1).

The tubular titanium oxide particles (PT-1) were placed in an electric oven having been controlled to 400° C., and an ammonia gas ($NH_3$, 10% by volume) diluted with nitrogen was fed to the electric oven for 2 hours to prepare reduction type tubular titanium oxide particles (RPT-1).

The composition parameters of the resulting reduction type tubular titanium oxide particles (RPT-1) and the amount of residual $K_2O$ were measured. The results are set forth in Table 2. Further, a TEM photograph of the particles was taken to determine an average particle length (L), an average tube outer diameter $(D_{out})$ and an average tube inner diameter $(D_{in})$. The results are set forth in Table 2.

Furthermore, a powder resistance value was measured as electrical conductivity. The result is set forth in Table 2.

The powder resistance value was measured in the following manner. Into a through type alumina cylinder (inner sectional area: 1 cm$^2$), a conductive columnar electrode of piston type was first inserted at the bottom, then about 5 g of the reduction type tubular titanium oxide particles (RPT-1) were filled, and thereafter a conductive columnar electrode of piston type was also inserted at the top. Then, a pressure of 100 kg/cm$^2$ was applied to the powder by means of a hydraulic press, and in this state, terminals of a digital multimeter (tester) were connected to the upper and the lower columnar electrodes to measure a resistance value. The measured value was divided by a height of the pressurized powder filled. The result is set forth in Table 2.

Example B2

Preparation of Reduction Type Tubular Titanium Oxide Particles (RPT-2)

A water dispersion ($TiO_2$ concentration: 5% by weight) of the tubular titanium oxide particles obtained by the washing with water after the first hydrothermal treatment in Example B1 was prepared in an amount of 140 g. To the water dispersion, 0.35 g of citric acid was added, and then the mixture was subjected to hydrothermal treatment at 60° C. for 24 hours (second hydrothermal treatment). Then, washing with water and freeze drying were carried out to prepare tubular titanium oxide particles (PT-2).

Subsequently, the tubular titanium oxide particles were subjected to reduction treatment in the same manner as in Example B1 to prepare reduction type tubular titanium oxide particles (RPT-2).

The composition parameters of the resulting reduction type tubular titanium oxide particles (RPT-2) and the amount of residual $K_2O$ were measured. The results are set forth in Table 2. Further, a TEM photograph of the particles was taken to determine an average particle length (L), an average tube outer diameter $(D_{out})$ and an average tube inner diameter $(D_{in})$. Furthermore, electrical conductivity was measured. The results are set forth in Table 2.

Example B3

Preparation of Reduction Type Tubular Titanium Oxide Particles (RPT-3)

Reduction type tubular titanium oxide particles (RPT-3) were prepared in the same manner as in Example B2, except that a plasma gas ($NH_3$: 3%, $H_2$: 7%) was used as the gas in the reduction treatment.

The composition parameters of the resulting reduction type tubular titanium oxide particles (RPT-3) and the amount of residual $K_2O$ were measured. The results are set forth in Table 2. Further, a TEM photograph of the particles was taken to determine an average particle length (L), an average tube outer diameter $(D_{out})$ and an average tube inner diameter $(D_{in})$. Furthermore, powder resistance was measured. The results are set forth in Table 2.

Example B4

Preparation of Titanium Oxide Particle (T-4) Dispersion

A peroxotitanic acid aqueous solution (TiO$_2$ concentration: 0.5% by weight) of 3800 g was prepared in the same manner as in Example B1. The aqueous solution was mixed with 7.0 g of a silica sol (available from Catalysts & Chemicals Industries Co., Ltd., SI-350, SiO$_2$ concentration: 30% by weight, average particle diameter: 8 nm), and the mixture was heated at 95° C. for 3 hours to prepare a titanium oxide particle (T-4) dispersion having a TiO$_2$.SiO$_2$ concentration of 0.56% by weight. An average particle diameter of the titanium oxide particles (T-4) is set forth in Table 2.

Preparation of Reduction Type Tubular Titanium Oxide Particles (RPT-4)

To the titanium oxide particle (T-3) dispersion, 70 g of a KOH aqueous solution having a concentration of 40% by weight was added in such a manner that the molar ratio $(A_M)/(T_M)$ of the number of moles $(A_M)$ of the alkali metal hydroxide to the number of moles $(T_M)$ of TiO$_2$ became 10, and the mixture was subjected to hydrothermal treatment at 150° C. for 2 hours (first hydrothermal treatment).

The resulting particles were sufficiently washed with pure water. The amount of residual K$_2$O was 1.5% by weight.

Then, a water dispersion (TiO$_2$.SiO$_2$ concentration: 3% by weight) of the tubular titanium oxide particles was prepared. To the water dispersion, a cation exchange resin and an anion exchange resin were added in the same amount as that of the tubular titanium oxide particles, and the mixture was treated at 60° C. for 24 hours (second hydrothermal treatment). After sufficient washing with pure water again, a water dispersion (TiO$_2$.SiO$_2$ concentration: 3% by weight) of the tubular titanium oxide particles was prepared. To the water dispersion, citric acid was added in such an amount that the molar ratio of citric acid to TiO$_2$ became 0.1. The resulting dispersion had pH of 3. Then, the dispersion was subjected to hydrothermal treatment at 60° C. for 24 hours (second hydrothermal treatment of the second time). Then, washing with water and freeze drying were carried out to prepare tubular titanium oxide particles (PT-4).

Subsequently, the tubular titanium oxide particles were subjected to the same reduction treatment as in Example B1 to prepare reduction type tubular titanium oxide particles (RPT-4).

The composition parameters of the resulting reduction type tubular titanium oxide particles (RPT-4) and the amount of residual K$_2$O were measured. The results are set forth in Table 2. Further, a TEM photograph of the particles was taken to determine an average particle length (L), an average tube outer diameter ($D_{out}$) and an average tube inner diameter ($D_{in}$). Furthermore, powder resistance was measured. The results are set forth in Table 2.

Example B5

Preparation of Titanium Oxide Particle (T-5) Dispersion

A peroxotitanic acid aqueous solution (TiO$_2$ concentration: 0.5% by weight) of 3800 g was prepared in the same manner as in Example B1. The aqueous solution was mixed with 15.8 g of a silica sol (available from Catalysts & Chemicals Industries Co., Ltd., SI-550, SiO$_2$ concentration: 30% by weight, average particle diameter: 8 nm), and the mixture was heated at 95° C. for 3 hours to prepare a titanium oxide particle (T-5) dispersion having a TiO$_2$.SiO$_2$ concentration of 0.62% by weight. An average particle diameter of the titanium oxide particles (T-5) is set forth in Table 2.

Preparation of Reduction Type Tubular Titanium Oxide Particles (RPT-5)

To the titanium oxide particle (T-5) dispersion, 70 g of a KOH aqueous solution having a concentration of 40% by weight was added in such a manner that the molar ratio $(A_M)/(T_M)$ of the number of moles $(A_M)$ of the alkali metal hydroxide to the number of moles $(T_M)$ of TiO$_2$ became 10, and the mixture was subjected to hydrothermal treatment at 150° C. for 2 hours (first hydrothermal treatment). The resulting particles were sufficiently washed with pure water. The amount of residual K$_2$O was 2.0% by weight.

Then, a water dispersion (TiO$_2$.SiO$_2$ concentration: 3% by weight) of the tubular titanium oxide particles was prepared. To the water dispersion, a cation exchange resin and an anion exchange resin were added in the same amount as that of the tubular titanium oxide particles, and the mixture was treated at 60° C. for 24 hours (second hydrothermal treatment). After sufficient washing with pure water again, a water dispersion (TiO$_2$.SiO$_2$ concentration: 3% by weight) of the tubular titanium oxide particles was prepared. To the water dispersion, citric acid was added in such an amount that the molar ratio of citric acid to TiO$_2$ became 0.1. The resulting dispersion had pH of 3. Then, the dispersion was subjected to hydrothermal treatment at 60° C. for 24 hours (second hydrothermal treatment of the second time). Then, washing with water and freeze drying were carried out to prepare tubular titanium oxide particles (PT-5).

Subsequently, the tubular titanium oxide particles were subjected to the same reduction treatment as in Example B1 to prepare reduction type tubular titanium oxide particles (RPT-5).

The composition parameters of the resulting reduction type tubular titanium oxide particles (RPT-5) and the amount of residual K$_2$O were measured. The results are set forth in Table 2. Further, a TEM photograph of the particles was taken to determine an average particle length (L), an average tube outer diameter ($D_{out}$) and an average tube inner diameter ($D_{in}$). Furthermore, powder resistance was measured. The results are set forth in Table 2.

Example B6

Preparation of Titanium Oxide Particle (T-6) Dispersion

A peroxotitanic acid aqueous solution (titanium oxide particle (T-1) dispersion, TiO$_2$ concentration: 0.5% by weight) of 3800 g was prepared in the same manner as in Example B1. The aqueous solution was mixed with 19 g of a zirconia sol prepared in the following manner, and the mixture was heated at 95° C. for 3 hours to prepare a titanium oxide particle (T-6) dispersion having a TiO$_2$.ZrO$_2$ concentration of 0.52% by weight. An average particle diameter of the titanium oxide particles (T-6) is set forth in Table 2.

Preparation of Zirconia Sol

In a flask equipped with a dry distillation device, 5 kg of a zirconium chloride aqueous solution containing 0.036% by weight of zirconium chloride was placed, and with sufficient stirring, 290 g of 0.1 N ammonia water was slowly added. The resulting solution was heated at 95° C. for 50 hours to obtain an opaque white sol having a $ZrO_2$ concentration of 0.034% by weight and pH of 1.8. Then, 0.1 N ammonia water was further added to adjust pH to 4.8, and the resulting solution was washed with ion exchange water until no chlorine ion was detected in the filtrate to prepare a zirconia sol (average particle diameter: 50 nm) having a $ZrO_2$ concentration of 5% by weight as a dispersion.

Preparation of Reduction Type Tubular Titanium Oxide Particles (RPT-6)

To the titanium oxide particle (T-6) dispersion, 70 g of a KOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours (first hydrothermal treatment). The resulting particles were sufficiently washed with pure water. The amount of residual $K_2O$ was 1.7% by weight. Then, tubular titanium oxide particles (PT-6) were prepared in the same manner as in Example B5.

Subsequently, the tubular titanium oxide particles were subjected to the same reduction treatment as in Example B1 to prepare reduction type tubular titanium oxide particles (RPT-6).

The composition parameters of the resulting reduction type tubular titanium oxide particles (RPT-6) and the amount of residual $K_2O$ were measured. The results are set forth in Table 2. Further, a TEM photograph of the particles was taken to determine an average particle length (L), an average tube outer diameter $(D_{out})$ and an average tube inner diameter $(D_{in})$. Furthermore, electrical conductivity was measured. The results are set forth in Table 2.

Comparative Example B1

As tubular titanium oxide particles, the tubular titanium oxide particles (PT-1) prepared in Example B1 were used.

Comparative Example B2

Preparation of Tubular Titanium Oxide Particles (RPT-8)

Reduction type tubular titanium oxide particles (RPT-8) were prepared in the same manner as in Example B1, except that the reduction treatment temperature was changed to 700° C.

The composition parameters of the resulting reduction type tubular titanium oxide particles (RPT-8) and the amount of residual $K_2O$ were measured. The results are set forth in Table 2. Further, a TEM photograph of the particles was taken to determine an average particle length (L), an average tube outer diameter $(D_{out})$ and an average tube inner diameter $(D_{in})$. Furthermore, electrical conductivity was measured. The results are set forth in Table 2.

Comparative Example B3

Preparation of Tubular Titanium Oxide Particles (RPT-9)

Reduction type tubular titanium oxide particles (RPT-9) were prepared in the same manner as in Example B1, except that a $H_2$ gas was used instead of the $NH_3$ gas and the reduction treatment temperature was changed to 500° C.

The composition parameters of the resulting reduction type tubular titanium oxide particles (RPT-9) and the amount of residual $K_2O$ were measured. The results are set forth in Table 2. Further, a TEM photograph of the particles was taken to determine an average particle length (L), an average tube outer diameter $(D_{out})$ and an average tube inner diameter $(D_{in})$. Furthermore, electrical conductivity was measured. The results are set forth in Table 2.

Comparative Example B4

As tubular titanium oxide particles, the tubular titanium oxide particles (PT-1) prepared in Example B4 were used to measure electrical conductivity. The result is set forth in Table 2.

TABLE 2

| | Titanium oxide type starting particles | | Dispersion | Reduction treatment | | |
|---|---|---|---|---|---|---|
| | Composition | Average particle diameter (nm) | Concentration (wt. %) | Atmosphere | Temperature (° C.) | Time (hr) |
| Ex. B1 | $TiO_2$ | 100 | 30 | 0.5 | $NH_3$ | 400 | 2 |
| Ex. B2 | $TiO_2$ | 100 | 30 | 0.5 | $NH_3$ | 400 | 2 |
| Ex. B3 | $TiO_2$ | 100 | 30 | 0.5 | $NH_3 + H_2$ | 300 | 2 |
| Ex. B4 | $TiO_2 \cdot SiO_2$ | 90/10 | 20 | 0.56 | $NH_3$ | 400 | 2 |
| Ex. B5 | $TiO_2 \cdot SiO_2$ | 80/20 | 10 | 0.62 | $NH_3$ | 400 | 2 |
| Ex. B6 | $TiO_2 \cdot SiO_2$ | 95/5 | 10 | 0.52 | $NH_3$ | 400 | 2 |
| Comp. Ex. B1 | $TiO_2$ | 100 | 30 | 0.5 | — | — | — |
| Comp. Ex. B2 | $TiO_2$ | 100 | 30 | 0.5 | $NH_3$ | 700 | 2 |

TABLE 2-continued

| | | | | | | | | |
|---|---|---|---|---|---|---|---|---|
| Comp. Ex. B3 | TiO$_2$ | 100 | 30 | 0.5 | H$_2$ | | 550 | 2 |
| Comp. Ex. B4 | TiO$_2$·SiO$_2$ | 90/10 | 20 | 0.56 | — | | — | — |

| | Tubular titanium oxide particles | | | | | | | |
|---|---|---|---|---|---|---|---|---|
| | Average particle length (nm) | Average tube outer diameter (nm) | Average tube inner diameter (nm) | Composition (Ti$_a$M$_b$O$_x$N$_y$) | | | | Powder resistance (Ω · cm) |
| | | | | a (Ti) | b (M) | x (O) | y (N) | K$_2$O (ppm) | |
| Ex. B1 | 180 | 10 | 7.5 | 1 | — | 1.2 | 0.02 | 250 | 5 |
| Ex. B2 | 180 | 10 | 7.5 | 1 | — | 1.2 | 0.02 | 50 | 0.5 |
| Ex. B3 | 180 | 10 | 7.5 | 1 | — | 0.9 | — | 50 | 0.1 |
| Ex. B4 | 145 | 10 | 7.5 | 0.9 | 0.1 | 1.22 | 0.02 | 40 | 100 |
| Ex. B5 | 225 | 10 | 7.5 | 0.9 | 0.1 | 1.24 | 0.02 | 80 | 5000 |
| Ex. B6 | 175 | 10 | 7.5 | 0.95 | 0.05 | 1.2 | 0.02 | 240 | 10 |
| Comp. Ex. B1 | 180 | 10 | 7.5 | 1 | — | 2 | 0 | 250 | 5 × 10$^6$ |
| Comp. Ex. B2 | 180 | 10 | 7.5 | 1 | — | 0.98 | 0.04 | 250 | 0.05 |
| Comp. Ex. B3 | 180 | 10 | 7.5 | 1 | — | 0.9 | — | 250 | 0.01 |
| Comp. Ex. B4 | 145 | 10 | 7.5 | 0.9 | 0.1 | 2 | 0 | 40 | 1 × 10$^7$ |

Preparation Example C1

Preparation of Titanium Oxide Particle (T-1) Dispersion

A titanium chloride aqueous solution was diluted with pure water to prepare a titanium chloride aqueous solution having a TiO$_2$ concentration of 5% by weight. The aqueous solution was added to ammonia water having a concentration of 15% by weight and having been controlled to a temperature of 5° C. to perform neutralization and hydrolysis. After the addition of the titanium chloride aqueous solution, the resulting gel had pH of 10.5. Then, the gel was washed by filtration to obtain a gel of orthotitanic acid having a TiO$_2$ concentration of 9% by weight.

Thereafter, 100 g of the gel of orthotitanic acid was dispersed in 2900 g of pure water, then 800 g of hydrogen peroxide water having a concentration of 35% by weight was added, and with stirring, the mixture was heated at 85° C. for 3 hours to prepare a peroxotitanic acid aqueous solution. The peroxotitanic acid aqueous solution obtained had a TiO$_2$ concentration of 0.5% by weight.

Subsequently, the resulting solution was heated at 95° C. for 10 hours to give a titanium oxide particle dispersion, and to the titanium oxide particle dispersion, tetramethylammonium hydroxide (TMAH, MW: 149.2) was added in such an amount that the molar ratio of TMAH to TiO$_2$ in the dispersion became 0.016. The resulting dispersion had pH of 11. Then, the dispersion was subjected to hydrothermal treatment at 230° C. for 5 hours to prepare a titanium oxide particle (T-1) dispersion. The titanium oxide particles (T-1) had an average particle diameter of 30 nm.

Preparation of Tubular Titanium Oxide Particles (PT-1)

To the titanium oxide particle (T-1) dispersion, 70 g of a NaOH aqueous solution having a concentration of 40% by weight was added in such a manner that the molar ratio ($A_M$)/($T_M$) of the number of moles ($A_M$) of the alkali metal hydroxide to the number of moles ($T_M$) of TiO$_2$ became 10, and the mixture was subjected to hydrothermal treatment at 150° C. for 10 hours.

The resulting particles were sufficiently washed with pure water. Then, alkali was decreased by the use of a cation exchange resin to prepare tubular titanium oxide particles (PT-1-1). The amount of residual Na$_2$O was 0.15% by weight.

Subsequently, to a water dispersion (TiO$_2$ concentration: 5% by weight) of the tubular titanium oxide particles (PT-1-1), tetramethylammonium hydroxide (TMAH) was added as an organic base in such an amount that the molar ratio of TMAH to TiO$_2$ became 0.1. The resulting dispersion had pH of 13.2. Then, the dispersion was subjected to hydrothermal treatment at 110° C. for 5 hours to prepare tubular titanium oxide particles (PT-1).

The resulting tubular titanium oxide particles (PT-1) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Evaluation Criteria of Crystalline State

Evaluation was made based on the height of a peak at a lattice constant d of 1.89.

AA: The peak is obviously higher than that of the tubular titanium oxide particles (PT-1-1).

BB: The peak is almost the same as that of the tubular titanium oxide particles (PT-1-1).

CC: The peak is obviously lower than that of the tubular titanium oxide particles (PT-1-1).

DD: The particles are substantially amorphous.

The crystal type (crystal form) of the particles (PT-1-1) was anatase type.

Preparation Example C2

Preparation of Tubular Titanium Oxide Particles (PT-2)

Tubular titanium oxide particles (PT-2) were prepared in the same manner as in Preparation Example C1, except that instead of TMAH, citric acid was added to the water dispersion (TiO$_2$ concentration: 5% by weight) of the tubular titanium oxide particles (PT-1-1) in such an amount that the molar ratio of citric acid to TiO$_2$ became 0.1.

The resulting tubular titanium oxide particles (PT-2) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Preparation Example C3

Preparation of Tubular Titanium Oxide Particles (PT-3)

To a titanium oxide particle (T-1) dispersion prepared in the same manner as described above, 40 g of a NaOH aqueous solution having a concentration of 40% by weight and 358 g of a tetramethylammonium hydroxide (TMAH) aqueous solution having a concentration of 25% by weight were added in such a manner that the molar ratio $[(A_M)+(OB_M)]/(T_M)$ of the total of the number of moles ($A_M$) of the alkali metal hydroxide and the number of moles ($OB_M$) of the organic base to the number of moles ($T_M$) of $TiO_2$ became 10, and the mixture was subjected to hydrothermal treatment at 150° C. for 2 hours. The resulting particles were sufficiently washed with pure water. Then, alkali was decreased by the use of a cation exchange resin to prepare tubular titanium oxide particles (PT-2-1). The amount of residual $Na_2O$ was 0.12% by weight.

Subsequently, to a water dispersion ($TiO_2$ concentration: 5% by weight) of the tubular titanium oxide particles (PT-2-1), citric acid was added in such an amount that the molar ratio of citric acid to $TiO_2$ became 0.1. The resulting dispersion had pH of 3.0. Then, the dispersion was subjected to hydrothermal treatment at 150° C. for 15 hours to prepare tubular titanium oxide particles (PT-3).

The resulting tubular titanium oxide particles (PT-3) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Preparation Example C4

Preparation of Titanium Oxide Particle (T-2) Dispersion

A peroxotitanic acid aqueous solution ($TiO_2$ concentration: 0.5% by weight) of 3800 g was prepared in the same manner as described above. The aqueous solution was mixed with 7.0 g of a silica sol (available from Catalysts & Chemicals Industries Co., Ltd., SI-350, $SiO_2$ concentration: 30% by weight, average particle diameter: 8 nm), and the mixture was heated at 95° C. for 3 hours to prepare a titanium oxide particle (T-2) dispersion having a $TiO_2.SiO_2$ concentration of 0.56% by weight. The titanium oxide particles (T-2) had an average particle diameter of 20 nm.

Preparation of Tubular Titanium Oxide Particles (PT-4)

To the titanium oxide particle (T-2) dispersion, 70 g of a NaOH aqueous solution having a concentration of 40% by weight was added in such a manner that the molar ratio $(A_M)/(T_M)$ of the number of moles ($A_M$) of the alkali metal hydroxide to the number of moles ($T_M$) of $TiO_2$ became 10, and the mixture was subjected to hydrothermal treatment at 150° C. for 10 hours. The resulting particles were sufficiently washed with pure water. Then, alkali was decreased by the use of a cation exchange resin to prepare tubular titanium oxide particles (PT-4-1). The amount of residual $Na_2O$ was 0.45% by weight.

Subsequently, to a water dispersion ($TiO_2.SiO_2$ concentration: 3% by weight) of the tubular titanium oxide particles (PT-4-1), citric acid was added in such an amount that the molar ratio of citric acid to $TiO_2$ became 0.1. The resulting dispersion had pH of 3.0. Then, the dispersion was subjected to hydrothermal treatment at 150° C. for 15 hours to prepare tubular titanium oxide particles (PT-4).

The resulting tubular titanium oxide particles (PT-4) were washed with water and dried. Then, alkali and $SiO_2$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Preparation Example C5

Preparation of Titanium Oxide Particle (T-3) Dispersion

A peroxotitanic acid aqueous solution ($TiO_2$ concentration: 0.5% by weight) of 3800 g was prepared in the same manner as described above. The aqueous solution was mixed with 15.8 g of a silica sol (available from Catalysts & Chemicals Industries Co., Ltd., SI-550, $SiO_2$ concentration: 30% by weight, average particle diameter: 8 nm), and the mixture was heated at 95° C. for 3 hours to prepare a titanium oxide particle (T-3) dispersion having a $TiO_2.SiO_2$ concentration of 0.62% by weight. The titanium oxide particles (T-3) had an average particle diameter of 10 nm.

Preparation of Tubular Titanium Oxide Particles (PT-5)

To the titanium oxide particle (T-3) dispersion, 7.0 g of a NaOH aqueous solution having a concentration of 40% by weight was added in such a manner that the molar ratio $(A_M)/(T_M)$ of the number of moles ($A_M$) of the alkali metal hydroxide to the number of moles ($T_M$) of $TiO_2$ became 10, and the mixture was subjected to hydrothermal treatment at 150° C. for 2 hours. The resulting particles were sufficiently washed with pure water. Then, alkali was decreased by the use of a cation exchange resin to prepare tubular titanium oxide particles (PT-5-1). The amount of residual $Na_2O$ was 0.50% by weight.

Subsequently, to a water dispersion ($TiO_2.SiO_2$ concentration: 3% by weight) of the tubular titanium oxide particles (PT-5-1), citric acid was added in such an amount that the molar ratio of citric acid to $TiO_2$ became 0.1. The resulting dispersion had pH of 3.0. Then, the dispersion was subjected to hydrothermal treatment at 150° C. for 15 hours to prepare tubular titanium oxide particles (PT-5).

The resulting tubular titanium oxide particles (PT-5) were washed with water and dried. Then, alkali and $SiO_2$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Preparation Example C6

Preparation of Titanium Oxide Particle (T-4) Dispersion

A peroxotitanic acid aqueous solution ($TiO_2$ concentration: 0.5% by weight) of 3800 g was prepared in the same manner as described above. The aqueous solution was mixed with 21 g of an alumina sol (available from Catalysts & Chemicals Industries Co., Ltd., AS-2, $Al_2O_3$ concentration: 10% by weight), and the mixture was heated at 95° C. for 3 hours to prepare a titanium oxide particle (T-4) dispersion having a $TiO_2 \cdot Al_2O_3$ concentration of 0.55% by weight. The titanium oxide particles (T-43) had an average particle diameter of 20 nm.

Preparation of Tubular Titanium Oxide Particles (PT-6)

To the titanium oxide particle (T-4) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 0.10, and the mixture was subjected to hydrothermal treatment at 150° C. for 10 hours. The resulting particles were sufficiently washed with pure water. Then, alkali was decreased by the use of a cation exchange resin to prepare tubular titanium oxide particles (PT-6-1). The amount of residual $Na_2O$ was 0.50% by weight.

Subsequently, to a water dispersion ($TiO_2 \cdot Al_2O_3$ concentration: 3% by weight) of the tubular titanium oxide particles (PT-6-1), citric acid was added in such an amount that the molar ratio of citric acid to $TiO_2$ became 0.1. The resulting dispersion had pH of 3.0. Then, the dispersion was subjected to hydrothermal treatment at 150° C. for 15 hours to prepare tubular titanium oxide particles (PT-6).

The resulting tubular titanium oxide particles (PT-6) were washed with water and dried. Then, alkali and $Al_2O_3$ were analyzed, and a TEM photograph of the particles was taken to determine an average particle length (L), an average tube outer diameter $(D_{out})$ and an average tube inner diameter $(D_{in})$. Further, specific surface area of the particles and the crystalline state thereof were evaluated. The results are set forth in Table 3.

Preparation Example C7

Preparation of Titanium Oxide Particle. (T-5) Dispersion

A peroxotitanic acid aqueous solution ($TiO_2$ concentration: 0.5% by weight) of 3800 g was prepared in the same manner as described above. The aqueous solution was mixed with 19 g of a zirconia sol prepared in the following manner, and the mixture was heated at 95° C. for 3 hours to prepare a titanium oxide particle (T-5) dispersion having a $TiO_2 \cdot ZrO_2$ concentration of 0.52% by weight. The titanium oxide particles (T-5) had an average particle diameter of 10 nm.

Preparation of Zirconia Sol

In a flask equipped with a dry distillation device, 5 kg of a zirconium chloride aqueous solution containing 0.036% by weight of zirconium chloride was placed, and with sufficient stirring, 290 g of 0.1 N ammonia water was slowly added. The resulting solution was heated at 95° C. for 50 hours to obtain an opaque white sol having a $ZrO_2$ concentration of 0.034% by weight and pH of 1.8. Then, 0.1 N ammonia water was further added to adjust pH to 4.8, and the resulting solution was washed with ion exchange water until no chlorine ion was detected in the filtrate to prepare a zirconia sol (average particle diameter: 50 nm) having a $ZrO_2$ concentration of 5% by weight as a dispersion.

Preparation of Tubular Titanium Oxide Particles (PT-7)

To the titanium oxide particle (T-5) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 10 hours. The resulting particles were sufficiently washed with pure water. Then, alkali was decreased by the use of a cation exchange resin to prepare tubular titanium oxide particles (PT-7-1). The amount of residual $Na_2O$ was 0.3% by weight.

Subsequently, to a water dispersion ($TiO_2 \cdot ZrO_2$ concentration: 3% by weight) of the tubular titanium oxide particles (PT-7-1), citric acid was added in such an amount that the molar ratio of citric acid to $TiO_2$ became 0.1. The resulting dispersion had pH of 3.0. Then, the dispersion was subjected to hydrothermal treatment at 150° C. for 15 hours to prepare tubular titanium oxide particles (PT-7).

The resulting tubular titanium oxide particles (PT-7) were washed with water and dried. Then, alkali and $ZrO_2$ were analyzed, and a TEM photograph of the particles was taken to determine an average particle length (L), an average tube outer diameter $(D_{out})$ and an average tube inner diameter $(D_{in})$. Further, specific surface area of the particles and the crystalline state thereof were evaluated. The results are set forth in Table 3.

Comparative Preparation Example C1

Preparation of Titanium Oxide Particle (T-6) Dispersion

A titanium oxide particle (T-1) dispersion prepared in the same manner as described above was dried and then calcined at 600° C. for 2 hours. The calcined product was pulverized to obtain a titanium oxide powder having an average particle diameter of 200 nm. Then, the powder was dispersed in water to prepare a titanium oxide particle (T-6) dispersion having a $TiO_2$ concentration of 10% by weight.

Preparation of Tubular Titanium Oxide Particles (PT-8)

To the titanium oxide particle (T-6) dispersion, 70 g of a NaOH aqueous solution having a concentration of 40% by weight was added in such a manner that the molar ratio $(A_M)/(T_M)$ of the number of moles $(A_M)$ of the alkali metal hydroxide to the number of moles $(T_M)$ of $TiO_2$ became 10, and the mixture was subjected to hydrothermal treatment at 150° C. for 2 hours. The resulting particles were sufficiently washed with pure water. Then, alkali was decreased by the use of a cation exchange resin to prepare tubular titanium oxide particles (PT-8-1). The amount of residual $Na_2O$ was 0.60% by weight.

Subsequently, to a water dispersion ($TiO_2$ concentration: 3% by weight) of the tubular titanium oxide particles (PT-8-

1), tetramethylammonium hydroxide (TMAH) was added as an organic base in such an amount that the molar ratio of TMAH to $TiO_2$ became 0.1. The resulting dispersion had pH of 13.2. Then, the dispersion was subjected to hydrothermal treatment at 110° C. for 5 hours to prepare tubular titanium oxide particles (PT-8).

The resulting tubular titanium oxide particles (PT-8) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Comparative Preparation Example C2

Preparation of Titanium Oxide Particle (T-7) Dispersion

A titanium oxide particle (T-3) dispersion prepared in the same manner as described above was dried and then calcined at 600° C. for 2 hours. The calcined product was pulverized to obtain a titanium oxide powder having an average particle diameter of 300 nm. Then, the powder was dispersed in water to prepare a titanium oxide particle (T-7) dispersion having a $TiO_2 \cdot SiO_2$ concentration of 10% by weight.

Preparation of Tubular Titanium Oxide Particles (PT-9)

To the titanium oxide particle (T-7) dispersion, 70 g of a NaOH aqueous solution having a concentration of 40% by weight was added in such a manner that the molar ratio $(A_M)/(T_M)$ of the number of moles ($A_M$) of the alkali metal hydroxide to the number of moles ($T_M$) of $TiO_2$ became 10, and the mixture was subjected to hydrothermal treatment at 150° C. for 1 hours. The resulting particles were sufficiently washed with pure water. Then, alkali was decreased by the use of a cation exchange resin to prepare tubular titanium oxide particles (PT-9-1). The amount of residual $Na_2O$ was 0.70% by weight.

Subsequently, to a water dispersion ($TiO_2$ concentration: 3% by weight) of the tubular titanium oxide particles (PT-9-1), tetramethylammonium hydroxide (TMAH) was added as an organic base in such an amount that the molar ratio of TMAH to $TiO_2$ became 0.1. The resulting dispersion had pH of 13.2. Then, the dispersion was subjected to hydrothermal treatment at 150° C. for 15 hours to prepare tubular titanium oxide particles (PT-9).

The resulting tubular titanium oxide particles (PT-9) were washed with water and dried. Then, alkali and $SiO_2$ were analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Comparative Preparation Example C3

Preparation of Tubular Titanium Oxide Particles (PT-10)

Tubular titanium oxide particles (PT-10) were prepared in the same manner as in Comparative Preparation Example C2, except that instead of TMAH, citric acid was added to the water dispersion ($TiO_2$ concentration: 5% by weight) of the tubular titanium oxide particles (PT-9-1) in such an amount that the molar ratio of citric acid to $TiO_2$ became 0.1.

The resulting tubular titanium oxide particles (PT-10) were washed with water and dried. Then, alkali was analyzed, and a TEM photograph of the particles was taken to determine an average particle length (L), an average tube outer diameter ($D_{out}$) and an average tube inner diameter ($D_{in}$). Further, specific surface area of the particles and the crystalline state thereof were evaluated. The results are set forth in Table 3.

Example C1

Metal Oxide Semiconductor Film (A)

In 2 liters of pure water, 10 g of a titanium hydride powder was suspended, and to the resulting suspension, 800 g of hydrogen peroxide water having a concentration of 5% by weight was added over a period of 30 minutes. Then, the mixture was heated to 80° C. to prepare a solution of peroxotitanic acid.

A dispersion (oxide concentration: 10%) of the tubular titanium oxide particles (PT-1) was prepared, and the dispersion was mixed with the above-prepared peroxotitanic acid solution in such a manner that the weight ratio (peroxotitanic acid/tubular titanium oxide particles (PT-1), in terms of an oxide) of the peroxotitanic acid to the tubular titanium oxide particles (PT-1) became 0.1. Then, to the mixture, hydroxypropyl cellulose was added as a film forming aid in such an amount that the amount of all the oxides in the mixture became 30% by weight, to prepare a coating solution for forming a semiconductor film.

Subsequently, the coating solution was applied onto a transparent glass plate on which an electrode layer of fluorine-doped tin oxide had been formed, and the coating layer was air dried and then irradiated with ultraviolet rays of 6000 mJ/cm² by the use of a low-pressure mercury lamp to decompose peroxotitanic acid and thereby cure the coating film. The resulting film was heated at 300° C. for 30 minutes to perform decomposition of hydroxypropyl cellulose and annealing. Thus, a metal oxide semiconductor film (A) having a film thickness of 15 μm was formed.

A pore volume and an average pore diameter of the metal oxide semiconductor film (A) obtained were determined by a nitrogen adsorption method. The results are set forth in Table 3.

Adsorption of Photosensitizer

Subsequently, an ethanol solution (concentration: $3 \times 10^{-4}$ mol/liter) of a ruthenium complex represented by cis-($SCN^-$)-bis(2,2'-bipyridyl-4,4'-dicarboxylate)ruthenium(II) as a photosensitizer was prepared. The photosensitizer solution was applied onto the metal oxide semiconductor film (A) by the use of a spinner and then dried. The application and drying process was carried out five times. An adsorption amount of the photosensitizer on the metal oxide semiconductor film is set forth in Table 3.

Preparation of Photovoltaic Cell

In a mixed solvent of acetonitrile and ethylene carbonate in a volume ratio of 1:4 (acetonitrile:ethylene carbonate), tetrapropylammonium iodide and iodine were dissolved in such amounts that the tetrapropylammonium iodide concentration became 0.46 mol/liter and the iodine concentration became 0.06 mol/liter, to prepare an electrolytic solution.

The electrode previously prepared was used as one electrode, and as the other electrode, fluorine-doped tin oxide was used. On this electrode, a transparent glass substrate on which platinum had been supported was arranged in such a manner that the electrodes faced each other, and the sides were sealed with a resin. Then, the electrolytic solution was enclosed between the electrodes, and the electrodes were connected to each other with a lead wire to prepare a photovoltaic cell (A).

The photovoltaic cell (A) was irradiated with light having an intensity of 100 W/m$^2$ by the use of a solar simulator to measure Voc (voltage in a state of open circuit), Joc (current density in case of short circuit), FF (curve factor) and η (conversion efficiency). The results are set forth in Table 3.

indicates that the reaction proceeds more rapidly and methylene blue is decreased. The result is set forth in Table 3.

Examples C2 to C7, Comparative Examples C1 to C3

Preparation of Photovoltaic Cells (B) to (H)

Photovoltaic cells (B) to (H) were prepared in the same manner as in Example C1, except that the tubular titanium oxide particles (PT-2) to (PT-10) were each used. Then, Voc, Joc, FF and η were measured. The results are set forth in Table 3.

Preparation of Photocatalysts (BC) to (HC)

Photovoltaic cells (BC) to (HC) were prepared in the same manner as in Example C1, except that the tubular titanium oxide particles (PT-2) to (PT-10) were each used. Then, the activity was evaluated. The results are set forth in Table 3.

TABLE 3

| | Tubular titanium oxide particles | | | | Photovaltaic cell semiconductor film | | | | | | | Photo- |
|---|---|---|---|---|---|---|---|---|---|---|---|---|
| | Average particle length (nm) | Average tube outer diameter (nm) | Average tube inner diameter (nm) | Crystalline state | Specific surface area (m$^2$/g) | Pore volume (ml/g) | Average pore diameter (nm) | Adsorption amount of photosensitizer (μg/cm$^2$) | Voc (V) | Joc (mA/cm$^2$) | FF | η (%) | catalytic activity Absorbance |
| Ex. C1 | 180 | 10 | 7.5 | anatase AA | 450 | 0.6 | 7.5 | 70 | 0.70 | 15 | 0.75 | 7.9 | 0.30 |
| Ex. C2 | 180 | 10 | 7.5 | anatase AA | 450 | 0.6 | 7.5 | 70 | 0.70 | 15 | 0.75 | 7.9 | 0.25 |
| Ex. C3 | 175 | 10 | 7.5 | anatase AA | 400 | 0.6 | 7.5 | 70 | 0.75 | 16 | 0.80 | 9.6 | 0.25 |
| Ex. C4 | 145 | 10 | 7.5 | anatase AA | 500 | 0.6 | 7.5 | 60 | 0.75 | 5 | 0.50 | 1.9 | 0.10 |
| Ex. C5 | 225 | 10 | 7.5 | anatase AA | 450 | 0.6 | 7.5 | 55 | 0.75 | 3 | 0.40 | 0.9 | 0.05 |
| Ex. C6 | 175 | 10 | 7.5 | anatase AA | 450 | 0.6 | 7.5 | 55 | 0.75 | 9 | 0.60 | 4.1 | 0.25 |
| Ex. C7 | 175 | 10 | 7.5 | anatase AA | 500 | 0.6 | 7.5 | 55 | 0.75 | 10 | 0.60 | 4.5 | 0.20 |
| Comp. Ex. C1 | 375 | 10 *1 | 7.5 | anatase + Am CC | 450 | 0.6 | 7.5 | 50 | 0.70 | 11 | 0.65 | 5.0 | 0.45 |
| Comp. Ex. C2 | 375 | 10 *1 | 7.5 | anatase + Am CC | 500 | 0.6 | 7.5 | 50 | 0.70 | 2 | 0.20 | 0.3 | 0.40 |
| Comp. Ex. C3 | 375 | 10 *1 | 7.5 | anatase + Am CC | 500 | 0.6 | 7.5 | 50 | 0.70 | 2 | 0.20 | 0.3 | 0.38 |

Notes:
Am: amorphous
*1 A part of the particles are agglomerated.

Preparation of Photocatalyst

A photocatalyst (AC) was prepared in the same manner as in the preparation of the metal oxide semiconductor film (A), except that a transparent glass substrate on which no electrode layer was formed was used and the coating film was heated at 450° C. for 30 minutes after cured.

Activity Evaluation

A quartz cell (for optical measurements, 10×10×45 mm) was filled with a methylene blue solution having a concentration of 10 ppm. Then, the photocatalyst (AC) was immersed in the solution and irradiated with a Xe lamp (2 KW, spectral wavelength region: 209 to 706 nm). After 5 hours, an absorbance at a wavelength of 460 nm was measured. The absorbance of the solution measured before irradiation with the lamp was taken as 1. A lower absorbance

What is claimed is:

1. A process for preparing tubular crystalline titanium oxide-containing particles, comprising:

(a) preparing titanium oxide particles from peroxotitanic acid; and (b) subjecting a water dispersion sol, which is obtained by dispersing (i) the titanium oxide particles and/or (ii) titanium oxide type composite oxide particles comprising the titanium oxide particles and oxide particles other than titanium oxide in water, said particles having an average particle diameter of 2 to 100 nm, to hydrothermal treatment in the presence of an alkali metal hydroxide to form tubular crystalline titanium oxide-containing particles.

2. The process for preparing tubular crystalline titanium oxide-containing particles as claimed in claim 1, wherein reduction treatment is carried out after the hydrothermal treatment.

3. The process for preparing tubular crystalline titanium oxide-containing particles as claimed in claim 2, wherein the reduction treatment comprises nitriding treatment.

4. The process for preparing tubular crystalline titanium oxide-containing particles as claimed in claim 1, wherein the hydrothermal treatment is carried out in the presence of aramonium hydroxide and/or an organic base together with the alkali metal hydroxide.

5. The process for preparing tubular crystalline titanium oxide-containing particles as claimed in claim 1, wherein the oxide other than titanium oxide is an oxide of one or more elements selected from Group Ia, Group Ib, Group IIa, Group IIb, Group IIIa, Group IIIb, Group IVa, Group IVb, Group Va, Group Vb, Group VIa, Group VIb, Group VIIa and Group VIII of the periodic table.

6. The process for preparing tubular crystalline titanium oxide-containing particles as claimed in claim 5, wherein the oxide other than titanium oxide is one or more oxides selected from $SiO_2$, $ZrO_2$, $ZnO$, $Al_2O_3$, $CeO_2$, $Y_2O_3$, $Nd_2O_3$, $WO_3$, $Fe_2O_3$ and $Sb_2O_5$.

7. Tubular crystalline titanium oxide-containing particles obtained by the process of claim 6 and having a sodium content of not more than 0.1% by weight in terms of $Na_2O$.

8. Tubular crystalline titanium oxide-containing particles obtained by the process of claim 5 and having a sodium content of not more than 0.1% by weight in terms of $Na_2O$.

9. Tubular crystalline titanium oxide-containing particles obtained by the process of claim 1 and having a sodium content of not more than 0.1% by weight in terms of $Na_2O$.

10. Tubular crystalline titanium oxide-containing particles obtained by the process of claim 1 and having a sodium content of not more than 0.1% by weight in terms of $Na_2O$.

11. A process for preparing tubular crystalline titanium oxide-containing particles, comprising:
(a) preparing titanium oxide particles from peroxotitanic acid; and
(b) subjecting a water dispersion of the titanium oxide particles and/or titanium oxide type composite oxide particles comprising the titanium oxide particles and oxide particles other than titanium oxide, said titanium oxide particles and/or composite oxide particles having an average particle diameter of 2 to 100 nm, to hydrothermal treatment in the presence of an alkali metal hydroxide, and
then subjecting the water dispersion to reduction treatment to form tubular crystalline titanium oxide-containing particles.

12. The process for preparing tubular crystalline titanium oxide-containing particles as claimed in claim 11, wherein the reduction treatment comprises nitriding treatment.

13. The process for preparing tubular crystalline titanium oxide-containing particles as claimed in claim 11, wherein ammonium hydroxide and/or one or more organic bases are allowed to be present together with the alkali metal hydroxide.

14. The process for preparing tubular crystalline titanium oxide-containing particles as claimed in claim 11, wherein the oxide other than titanium oxide is an oxide of one or more elements selected from Group Ia, Group Ib, Group IIa, Group IIb, Group IIIa, Group IIIb, Group IVa, Group IVb, Group Va, Group Vb, Group VIa, Group VIb, Group VIIa and Group VIII of the periodic table.

15. Tubular crystalline titanium oxide-containing particles obtained by the process of claim 11 and having a sodium content of not more than 0.1% by weight in terms of $Na_2O$.

16. Tubular crystalline titanium oxide-containing particles represented by the following compositional formula (1):

$$Ti_aM_bO_xN_y \qquad (1)$$

wherein a and b are numbers satisfying the conditions of a+b=1 and b=0~0.2, x and y are numbers satisfying the conditions of $1 \leq x+y < 2$, $1 \leq x < 2$ and $0 \leq y < 0.2$, and M is an element other than Ti, and containing crystalline titanium oxide as a main component, wherein the crystalline titanium oxide is obtained by a process of preparing titanium oxide particles from peroxotitanic acid.

17. The tubular crystalline titanium oxide-containing particles as claimed in claim 16, having an outer diameter ($D_{out}$) of 5 to 40 nm, an inner diameter ($D_{in}$) of 4 to 20 nm, a tube thickness of 0.5 to 10 nm, a length (L) of 50 to 1000 nm and a length (L)/outer diameter ($D_{out}$) ratio (L/$D_{out}$) of 10 to 200.

18. The tubular crystalline titanium oxide-containing particles as claimed in claim 17, wherein the element M other than titanium is one or more elements selected from Group Ia, Group Ib, Group IIa, Group IIb, group IIIa, Group IIIb, Group IVa, Group IVb, Group Va, Group Vb, Group VIa, Group VIb, Group VIIa and Group VIII of the periodic table.

19. The tubular crystalline titanium oxide-containing particles as claimed in claim 16, wherein the element M other than titanium is one or more elements selected from Group Ia, Group Ib, Group IIa, Group IIb, Group IIIa, Group IIIb, Group IVa, Group IVb, Group Va, Group Vb, Group VIa, Group VIb, Group VIIa and Group VIII of the periodic table.

20. The tubular crystalline titanium oxide-containing particles as claimed in claim 19, wherein the element M other than titanium is one or more elements selected from Si, Zr, Zn, Al, Ce, Y, Nd, W, Fe and Sb.

* * * * *

UNITED STATES PATENT AND TRADEMARK OFFICE
CERTIFICATE OF CORRECTION

| | | |
|---|---|---|
| PATENT NO. | : 7,431,903 B2 | Page 1 of 1 |
| APPLICATION NO. | : 10/494176 | |
| DATED | : October 7, 2008 | |
| INVENTOR(S) | : Koyanagi et al. | |

It is certified that error appears in the above-identified patent and that said Letters Patent is hereby corrected as shown below:

Column 51, Lines 10-11, Claim 4, "aramonium" should read -- ammonium --

Signed and Sealed this

Seventeenth Day of February, 2009

JOHN DOLL
*Acting Director of the United States Patent and Trademark Office*